United States Patent
Orduna et al.

(10) Patent No.: US 10,354,351 B2
(45) Date of Patent: *Jul. 16, 2019

(54) PORTABLE SYSTEM FOR MANAGING EVENTS

(71) Applicant: The ADT Security Corporation, Boca Raton, FL (US)

(72) Inventors: Arthur Orduna, Delray Beach, FL (US); Dmitry Vaynriber, Hallandale, FL (US); Andrew Droney, Lutherville, MD (US); Shy Ward, Flower Mound, TX (US); Cynthia Haegley, Robbinsville, NJ (US); Clinton Masterson, San Francisco, CA (US); Bergen Davell, Boca Raton, FL (US); Robert Beaver, West Palm Beach, FL (US); Thomas Nakatani, Aurora, CO (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,417

(22) Filed: Aug. 6, 2018

(65) Prior Publication Data

US 2019/0026850 A1 Jan. 24, 2019

Related U.S. Application Data

(63) Continuation of application No. 14/517,554, filed on Oct. 17, 2014, now Pat. No. 10,055,803.

(Continued)

(51) Int. Cl.
*G06F 15/16* (2006.01)
*G06Q 50/26* (2012.01)
(Continued)

(52) U.S. Cl.
CPC ....... *G06Q 50/265* (2013.01); *G08B 21/0261* (2013.01); *H04L 67/10* (2013.01); *H04L 67/12* (2013.01)

(58) Field of Classification Search
CPC ....... H04L 67/10; H04L 67/12; G06Q 50/265; G08B 21/0261
See application file for complete search history.

(56) References Cited

U.S. PATENT DOCUMENTS

| | | | |
|---|---|---|---|
| 7,193,531 B2 * | 3/2007 | Ito | G06Q 30/02 340/539.18 |
| 7,904,053 B2 * | 3/2011 | Krasner | G08B 25/009 455/404.2 |

(Continued)

*Primary Examiner* — Moustafa M Meky
(74) *Attorney, Agent, or Firm* — Christopher & Weisberg, P.A.

(57) ABSTRACT

A system for interacting with a portable device is provided. The system is configured to process both personal and premises events, and includes at least one processor configured to generate device data for determining the location of the portable device and process sensor data in response to an event. The processor is further configured to generate situational data for the processed event. The situational data is based on the sensor data and the device data. The situational data includes information indicative of whether the event is an alarm event and if the event is the alarm event, whether the alarm event is one of a personal event and premises event. The processor is further configured to provide at least a portion of the situational data to the remote service site if the event is the alarm event and determine that confirmation has been received.

20 Claims, 26 Drawing Sheets

Related U.S. Application Data

(60) Provisional application No. 62/037,953, filed on Aug. 15, 2014, provisional application No. 61/892,190, filed on Oct. 17, 2013.

(51) Int. Cl.
*H04L 29/08* (2006.01)
*G08B 21/02* (2006.01)

(56) References Cited

U.S. PATENT DOCUMENTS

| | | | |
|---|---|---|---|
| 8,718,594 B2* | 5/2014 | Braznell | G08B 21/0227 |
| | | | 455/3.03 |
| 8,928,479 B2* | 1/2015 | Gonsalves | G08B 21/02 |
| | | | 340/539.11 |
| 9,401,983 B2* | 7/2016 | Lechner | G08B 21/12 |
| 10,055,803 B2* | 8/2018 | Orduna | G06Q 50/265 |
| 2013/0154823 A1* | 6/2013 | Ostrer | G08B 21/18 |
| | | | 340/539.1 |
| 2014/0225738 A1* | 8/2014 | Lechner | G08B 21/12 |
| | | | 340/603 |
| 2014/0373184 A1* | 12/2014 | Mahaffey | G06F 21/88 |
| | | | 726/35 |
| 2015/0215753 A1* | 7/2015 | Leipzig | G06F 9/453 |
| | | | 455/419 |

\* cited by examiner

PORTABLE SYSTEM FOR MANAGING EVENTS

CROSS-REFERENCE TO RELATED APPLICATION

This application is a Continuation of U.S. patent application Ser. No. 14/517,554, filed on Oct. 17, 2014, entitled "PORTABLE SYSTEM FOR MANAGING EVENTS", which is related to and claims priority to U.S. Provisional Patent Application Ser. No. 62/037,953, filed Aug. 15, 2014, entitled "METHOD FOR VERIFICATION OF AN ALARM EVENT USING OTHER DATA", and also is related to and claims priority to U.S. Provisional Patent Application Ser. No. 61/892,190, filed Oct. 17, 2013, entitled "PORTABLE SECURITY SYSTEM", the entireties of all of which are incorporated herein by reference.

TECHNICAL FIELD

The invention relates to a system for managing events, particularly to a system that enhances the ability of users to protect themselves, their families, and their personal property, homes, and digital assets by processing both personal and premises events.

BACKGROUND

The desire to be safe and secure—as to oneself, one's family and friends, and one's property—is fundamental. With the advent of the telegraph and telephone in the 1800's, technology allowed for the remote monitoring of a home and dramatic improvements in personal safety and security. As communication technology has improved over the years—such as with the creation of digital communications, cellular and other wireless networks, broadband and the Internet—so has the ability to protect one's home.

At the same time, these changes in technology have made personal protection more complex. People are physically more mobile today, are in their homes less, and are moving from one home to another more often. More activities are taking place outside the home, separate from one another, and via mobile devices. A person's identity, behaviors, situation, and other personal information, are becoming more and more valuable to them. Not only does this personal data need to be secure, but it can also be used to provide important insights into the health and security of individuals and their families—helping them to be more safe and secure. However, existing systems do not readily allow for an individual to fully manage and gain such insights.

The world's growing complexity is accelerating the need to better understand, manage and protect both physical assets and such personal information. Yet, there is currently no simple way for individuals to do so. Prior solutions are fragmented and isolated—typically focused on traditional protection of the home, or limited protection of an individual personally, with little insight into one's security.

Conventional means for helping to protect the physical safety of individuals while outside the home are limited—such as vehicle roadside assistance services that can connect a user with a live operator, who may also receive data on the vehicle's location and condition, or Mobile Personal Emergency Response Systems ("MPERS"). More recently, mobile phone applications have arisen that can provide the location of a person and their phone to friends and family, with some companies also having live operators to whom the person can similarly connect for roadside or other assistance. One drawback of such systems is that they do not provide the operator with any situational data beyond the location of the user or what the user is able to tell them verbally; and these systems to not enable the operator during an event (or the user subsequent to an event) to gain any insights from the past behavioral and current situational data about the user.

Existing home security systems and Personal Emergency Response Systems ("PERS") are typically professionally installed and professionally monitored safety systems, which have the benefit of quickly and reliably providing experienced, well-trained security professionals with the information that they need to act, at any time, to protect a homeowner in the event of an emergency. But because of their sophisticated nature (these systems often use a variety of wired and wireless sensors mounted throughout the home), the installation of such security systems often makes it impractical to move them to a new location. Security systems incorporating more recent all-in-one ("AIO") security panels, are typically less expensive and easier to install, but still may not be relocated easily, particularly depending on the sensors that are installed with the system.

Because of this, do-it-yourself ("DIY") security kits and self-contained security units (where the various sensors, a control panel, and remote communications are integrated in a single device) have emerged that can be set-up/configured and taken down/relocated by the homeowner. If such systems are not professionally monitored, they have the significant drawback that they are completely dependent on the homeowner being available to respond when an emergency arises, timely receiving notification of the event and sufficient information about it, and knowing how to properly assess each type of emergency situation to take appropriate action both to keep their family and themselves safe and to quickly obtain the assistance of the assistance of first responders. Moreover, first responders in many locations to not directly respond to self-monitored security systems. Even if professionally monitored, such conventional DIY systems still rely on the homeowner to be sufficiently knowledgeable about the technology to be able to recognize (and have the means provided by the provider of the security product) and correct any technical issues with the system that may otherwise make monitoring unreliable or unavailable; and for the homeowner to be knowledgeable about all local codes and ordinances on the installation and operation of security systems.

Even more recently, mobile device applications have emerged that are designed to provide some basic security detection features within a smart phone or tablet itself, such as using an onboard video camera as a motion detector, and providing notification (and typically a video clip) to the user through another mobile device, While such system may be used to detect entry into an area, they suffer from some of the aforementioned drawbacks of not being professionally monitored and serviced.

Prior systems are also not "smart" in that, while they use a limited amount of personal data about the user and events that have occurred, they are not capable of analyzing this data to anticipate the user's needs. They are also not capable of incorporating broader types of personal data to enhance this analysis, such as biometric information, photos, videos, lists of personal assets, characteristics, usage information, browsing history, etc. Such personal data can be created by individuals themselves (such as in profiles on social media or various smart phone applications); captured by others (such as Web site data or location data when using mobile devices), or data about people crafted from analysis of offered and/or captured data (such as credit scores and other data gathering services). All of this data could provide beneficial insights that can be used to better anticipate the user's needs.

Further, these prior systems e typically limited to one type of monitoring, namely, premises monitoring or personal safety monitoring. For example, as discussed above, home security systems such as AIO and some DIY security kits are directed to monitoring sensors installed at a premises. When one of the sensors are triggered, an alarm at the premises is activated to indicate a possible event at the premises. On the other hand, personal safety monitoring systems relate to using sensors built-in to a mobile device to detect one or more events such as a motion event. These two types of systems provide distinct functionally that are provided as separate systems with no interaction with one another, and receive no benefit provided from one system to the other.

SUMMARY OF THE INVENTION

The invention relates to a system for managing events such as alarm events, particularly to a system that enhances the ability of users to protect themselves, their families, and their personal property, homes, and digital assets by processing both personal and premises events.

The invention further relates to portable system (such as a smart phone or tablet) that may be carried by a user, and which may be programmed (such as via an application operating on a smart phone or tablet) to provide a user interface having one or more graphical elements overlaying location information and capable of indicating the location of the user or other designated users, providing health and safety related information based at least in part on the location of the user, providing navigation information for the individual and at least one of the other designated users, and enabling the user to communicate with one or more of the other designated users.

The invention also relates to a portable system configured to provide a monitoring on demand ("MOD") connection of the user with an operator at a remote monitoring center (optionally providing the operator with situational data about the use and the ability to communicate with the user and to contact the appropriate emergency responders as warranted for the user's current situation. Alternatively, the portable system may also be configured to establish a response on demand ("ROD") connection of the user directly with the appropriate emergency responders for the user's current location in the event of an emergency, based on information provided and updated by the monitoring center that can also monitor situational data about the user. This response on demand can also be initiated by the user, or by the device automatically based on a sensed condition and pre-determined parameters. In either situation, the portable system ay also be capable of simultaneously providing notification to designated third parties (such as family members) based on action of the user or automatically based on a sensed condition and pre-determined parameters.

In another aspect, the invention relates to a portable system configured to protect a location (which could be any area to be protected, such as a home, vehicle, or temporary site) against an intrusion, either alone using built-in capability (e.g., built-in camera and video analytics), connected peripherals (e.g., an external 180/360 camera or other sensor), and/or wireless peripherals (such as Bluetooth, ZigBee, or Z-wave devices). The portable system may also be capable of providing remote notification, access, and control, and communication with a remote monitoring center. Communication may be redundant via broadband and cellular. More broadly, the portable system may enable remote and local control of the operation of life style (e.g., home automation) and health related peripherals as well. The portable system may also utilize a docking device that is capable of communicating with the various peripherals and enabling remote communication (to the user and/or the monitoring center). Alternatively, the mobile device may communicate with the peripherals via an existing local area network (such as via a home Wi-Fi router).

In yet another aspect, the invention relates to a portable system configured to collect personal data for a user from a plurality of information sources (such as from use of the mobile device itself and from the aforementioned peripherals); analyze the personal data to generate insight data that includes insights about the user; and present at least a portion of the insight data to the user in a format that is contextually relevant to the user. The insight data may be based, for example, upon combination of different types of personal user data, other data, predetermined system criteria, behavioral data generated by the system based on an analysis of the user's actions (including in response to being presented their insight data or personal data or such data about populations of others in the system), and/or user determined criteria. The other data includes at least one of crime data, weather data, social media data, current event data, political data, law enforcement data, U.S. state database data, federal database data, non-U.S. government database data, news service data and Internet search engine data. The invention is capable of generating insight data by analyzing a mixture of different formats of personal data, such as video data analyzed along with text. The insight data may be used by the system, for example, to make or recommend changes to various setting within a user's security system (the portable system and/or a separate security system), to identify the user and take certain actions based on the user's behavioral data, etc.

The insight data about the user may also include a user (or system) defined scoring of different types of personal data that enables the user to track how they are doing against certain goals, or how they compare to other users it may be an absolute or a relative score. The scoring may be based on one type of personal data, multiple types, or a more comprehensive "life" score based on a larger collection of types of personal data about the user. The system may also be configured to enable a user to share certain personal data (and insight data) with other users within the system. Other users within the system can socialize on the user's data and the system may analyze the results of this socialization to generate further insight data about the user (and/or the other users who participated). The system may further be configured to help educate the user about the user's personal data, insight data, and behavioral data (and/or such data from others in the system), such as by providing recommended actions the user may take, activities the user may participate in to improve their scoring toward certain goals.

In another aspect of the invention, a system for interacting with a portable device is provided. The system is configured to process both personal and premises events. The system includes at least one processor configured to: generate device data for determining the location of the portable device and process sensor data in response to an event. The sensor data is from at least the portable device. The processor is further configured to generate situational data for the processed event. The situational data is based on the sensor data and the device data. The situational data includes information indicative of whether the event is an alarm event and if the event is the alarm event, whether the alarm event is one of a personal event and premises event. The processor is further configured to provide at least a portion of the situational data to the remote service site if the event is the alarm event and determine that confirmation has been received. The confirmation indicates the remote service site is responding to the event based on the provided situational data. The processor is further configured to provide the received confirmation to the portable device.

In accordance with another aspect of the invention, a method for a system to interact with a portable device and to process personal and premises events is provided. Device data for determining the location of the portable device is generated. Sensor data is processed in response to an event. The sensor data is from at least the portable device. Situational data is generated for the processed event. The situational data is based on the sensor data and the device data. The situational data includes information indicative of whether the event is an alarm event and if the event is the alarm event, whether the alarm event is one of a personal event and premises event. At least a portion of the situational data is provided to the remote service site if the event is the alarm event. A determination is made that the confirmation has been received. The confirmation indicates the remote service site is responding to the event based on the provided situational data. The received confirmation is provided to the portable device.

In accordance with another aspect of the invention, a portable user device is provided. The portable user device includes a communicator configured to receive premises sensor data from at least one premises sensor that is monitoring a premises and communicate with at least one of a first responder site and remote service site. The portable user device includes at least one device sensor configured to generate device sensor data. The portable user device includes a processor configured to: determine whether a personal event has occurred based on at least one of the premises sensor data and device sensor data. The personal event corresponds to an event occurring proximate the portable user device. The processor is further configured to determine whether a premises event has occurred based on at least one of the premises sensor data and device sensor data. The premises event corresponds to an event occurring at the premises. The processor is further configured to generate situational data in response to determining at least one of the personal event and premises event has occurred. The situational data is based on at least one of the premises sensor data and device sensor data. The processor is further configured to cause the communicator to transmit the situational data to at least one of the first responder site and remote service site. The situational data indicates that the at least one of the first responder site and remote service site are authorized to act on behalf of a user of the portable user device.

BRIEF DESCRIPTION OF THE DRAWINGS

A more complete understanding of the invention, and the attendant advantages and features thereof, will be more readily understood by reference to the following detailed description when considered in conjunction with the accompanying drawings wherein.

DETAILED DESCRIPTION

Figure 1:
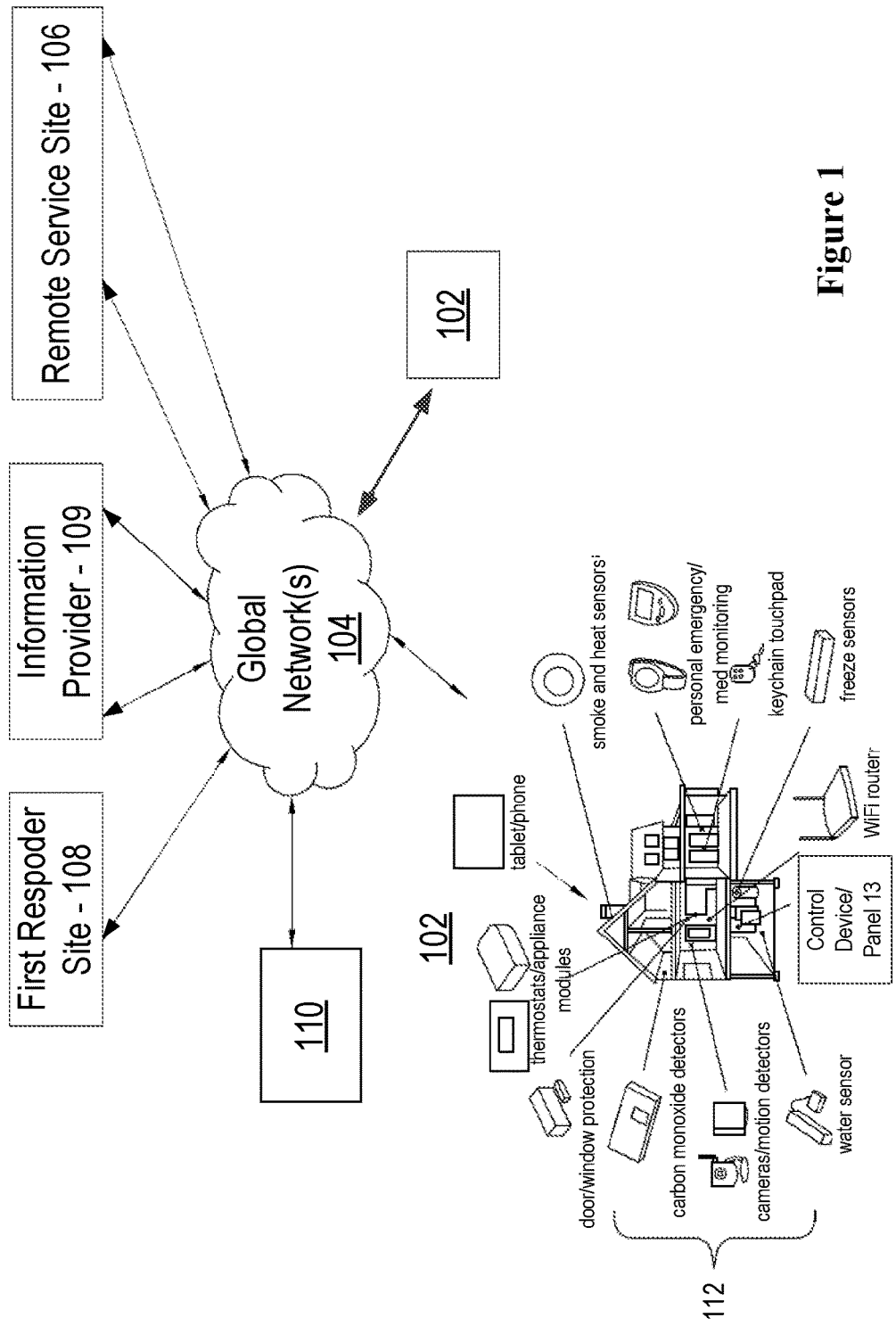
FIG. 1 is an illustration of a system employing the invention.

For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation.

Before describing in detail exemplary embodiments that are in accordance with the invention, it is noted that the embodiments reside primarily in combinations of device components and processing steps related to event management systems, such as fire and security systems; home automation and control systems; personal emergency response system (PERS), medical monitoring, and wellness systems; and related devices. Accordingly, components have been represented where appropriate by conventional symbols in the drawings, shown only those specific details that are pertinent to understanding the embodiments of the invention so as not to obscure the invention with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and would not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art appreciate that multiple components may interoperate and modifications and variations are possible of achieving the electrical and data communication.

Portable System and Supporting Infrastructure

The figures will be used to illustrate aspects of the invention where like reference designators are used to refer to like elements. As shown in FIG. 1, a portable device 102, portable user device 102 or system 102 may be located proximate a premises, e.g., a home, business, campus, park, etc. (any designated location), or may be located remote from a premises. In one embodiment, portable system 102 may communicate with remote service site 106, first responder site 108, information provider 109, emergency responder(s) 110 and/or premises security/automation system 112 via local and/or global network(s) 104.

Portable system 102 may be carried by a user, or by each of a group of other users (such as the user's family members) designated by the user. Portable system 102 may include any one of a number of known mobile devices such as a "smart phone" as shown, other cellular phones, and other Wi-Fi and/or cellular enable FDA's, such as tablets. Internally, such mobile devices include hardware and software (e.g., iOS, Android, Windows Phone, Blackberry, etc.), the operation of which is well known to those of ordinary skill in the art and will not be elaborated upon here. Such mobile devices are typically configured to be capable of downloading and operating a variety of software applications ("apps") in a conventional manner. One such app may be used in providing aspects of the invention as further discussed herein.

Such mobile devices also typically include a touch screen display and collectively the mobile device may be part of portable system 102 according to aspects of the invention. Alternatively, however, such mobile devices may incorporate myriad configurations of physical buttons, keypads, trackballs, and the like—either integral to the device, connected thereto via a communication cable, or in communication therewith via wireless protocol (e.g., Bluetooth, Wi-Fi, etc.), depending on what mobile device is used. The invention is not limited in this regard so long as the mobile device operates in accordance with the invention as described herein, such as part of portable system 102.

Figure 2:
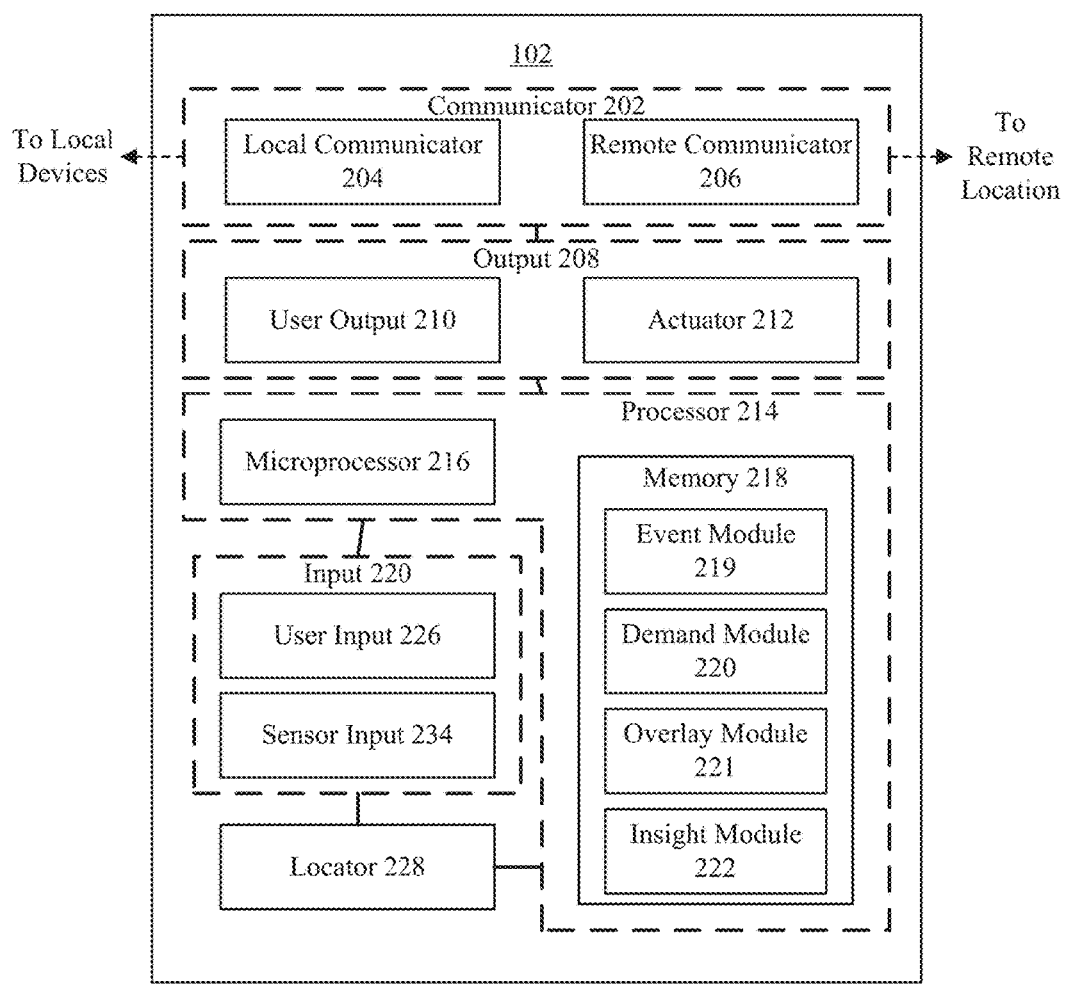
FIG. 2 is an illustration of functional elements of a portable system operating in accordance with aspects of the invention.

Some examples of functional elements of portable system 102 for the invention are illustrated in FIG. 2. Those of ordinary skill in the art will appreciate that these functional elements may be implemented in various combinations of hardware and software, either within a smart phone or other mobile device or in combination therewith. Some of these combinations will be referenced herein for illustration; the invention is not limited to those embodiments but only as set forth in the claims. In one embodiment, portable system 102 is a portable device or portable user device.

As shown in FIG. 2, portable system 102 may also include a processor component 214 that includes a microprocessor 214 and memory 218 (and other related hardware known to those of ordinary skill in the art) that are used to process information and actuate the functionality of the invention and the other functional elements of portable system 102 and to store information used therewith. Portable system 102 may be a portable device. This may include, for example, an app running atop an operating system in a microprocessor using volatile/non-volatile memory. For example, non-volatile memory may include flash memory, memory stick and the like. Also, volatile memory may include random access memory and others known in the art.

Memory 218 may include program instructions such as those for event module 219. For example, event module 219 includes instructions, which when executed by processor 214, cause processor 214 to perform the event process, discussed in detail with reference to FIG. 9. Memory 218 may include program instructions for demand module 220. For example, demand module 220 includes instructions, which when executed by processor 214, causes processor 214 to perform the demand process, discussed in detail with reference to FIG. 10. Memory 218 may include program instructions for overlay module 221. For example, overlay module 221 includes instructions, which when executed by processor 214, causes processor 214 to perform the overly process, discussed in detail below with reference to FIG. 11. Memory 218 may include program instructions for insight module 222. For example, insight module 222 includes instructions, which when executed by processor 214, causes processor 214 to perform the insight process, discussed in detail below with reference to FIG. 12. One or more portable devices 102 may include one or more modules 219-222 depending on design implementation, and specific functionality requirement.

Portable system 102 may include an input component 220, which may include user input 224 by which a user may manually provide input and/or actuate various aspects of the invention. Similarly, portable system 102 may include output component 208 having a user output 210 by which the system may provide information back to the user. In a smart phone or tablet, these functional elements may overlap with the use of a touch screen.

Input component 220 may also include one or more sensor inputs 224 that enable portable system 102 to receive input such as sensor data with or without user intervention. Input component 220 may provide at least a portion of the sensor data to the device processor 214. In a smart phone or tablet, for example, the input may be from an onboard video camera, a microphone, and/or an accelerometer, among other phone or tablet components. Output component 208 may also include actuator 212, through which portable system 102 may provide a control output to achieve some change of state or action (in response to processor component 214 of another part of portable system 102 or a connected/wireless peripheral device. In a smart phone or tablet, for example, this may mean causing the onboard speaker to broadcast an audible alert, or for the display or light to flash, or for the camera to take a picture/record video, etc.

Portable system 102 may also include a communicator component 202, which may itself include a local communicator 204 (for connected/wireless communication with devices in proximity to portable system 102, and a remote communicator 206 for communication remotely from the system. In a smart phone or tablet for example, this may be a radio utilizing any number of well know RF communication schemes; e.g., local communication may be, for example, via Wi-Fi or Bluetooth (or a device enhanced with "mesh" networking components and/or programming such as for Z-Wave or ZigBee); and remote communication may be, for example, via the various forms of cellular radio or broadband via a Wi-Fi connection to a local network or wide area network, or even satellite if so equipped. In one embodiment, processor 214 controls the operation of the input component 220, wireless communication component 202, and user interface 226. The wireless communication component 202, input component 220, and device processor 214 are configured to establish communication with the sensor based on at least one criterion. The at least one criterion includes at least one of the device data, a user profile and an input by the user through the user interface 226. In one embodiment, communicator 202 is configured to receive premises sensor data from at least one premises sensor 112 that is monitoring a premises and communicate with at least one of a first responder site 108 and remote service site 106.

Portable system 102 may communicate with one or more remote service sites 106 and/or first responder sites 108 at one or more remote locations, as described herein, via one or more networks 104. In a mobile phone or tablet, for example, remote communicator 206 may connect directly with a cellular network, satellite network, or may connect through a local or wide area Wi-Fi network and the Internet—all of which could form part of network(s) 104. The invention is not limited in this regard.

Figure 3A:
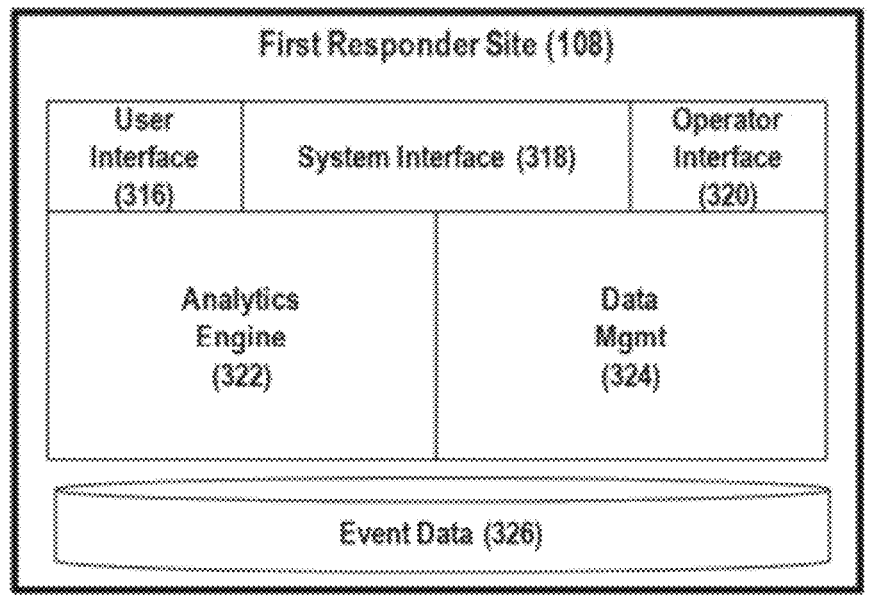
FIGS. 3(a)-(b) are illustrations of functional elements remote sites operating in accordance with the invention.
Figure 3B:
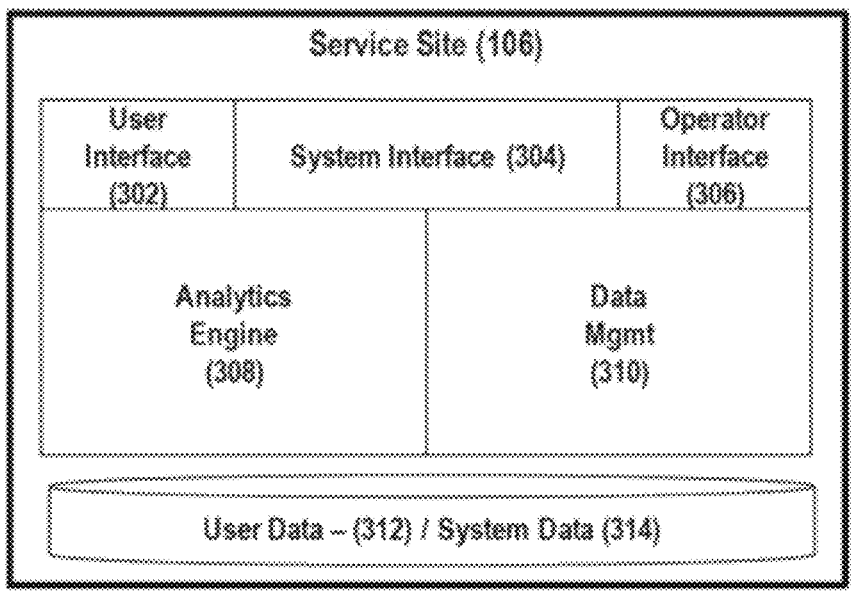

As shown in FIGS. 3(a)-(b), remote service site 106 functionally may include a user interface 302 for receiving information from and transmitting information to the user via portable system 102; a system interface 304 for receiving information from and transmitting information to portable system 102 or other systems (such as at first responder site 108); an operator interface 306 for the operator to receive and enter data as well as to communicate with the user or with dispatch personnel at first responder site 108; an analytics engine for processing information from the aforementioned interfaces and user data 312/system data 314; and a data management platform 310 for storing and manipulating data in conjunction with the interfaces and the analytics engine.

User interface 302 may include, for example, any combination of technologies capable of connecting the user with remote service site 106 and enabling the functionality described herein, such as an application operating on portable system 102, a broadband network gateway device on the user's home network or on a remote network, etc. System interface 304 may include, for example, application program interfaces ("API's") and similar software for facilitating the transmission (and understanding) of data. Similarly, the remaining functionality and components of remote service site 106 and the invention generally may include integrated or separate hardware, software, data architectures, and other devices known in the art that can achieve the functionality described herein.

Remote service site 106 may include, for example a security monitoring center having receiving equipment (e.g., computer servers) for receiving in-bound calls from portable system 102 and exchanging information therewith, and routing calls to a human operator. The operator may use database software and systems to retrieve information about the user based on user and event information received from portable system 102 and engage in two-way voice communication with the user. First responder site 108 may be equipped and function in a manner similar to service site 106, where an emergency operator is authorized the dispatch of emergency personnel 110 (e.g., police, fire, and paramedics) to address an emergency situation.

A premises event monitoring system 112, as shown in FIG. 1, typically includes a system control panel or device for monitoring and/or controlling sensors/control devices over a local network (portions, or the entirety, of which may be wireless). The controller typically includes substantially the same components as portable system 102 with size and performance varying based on design choice. In particular, control device 13 may include one or more of modules 219-222. As described further below, one or more controllers for premises system 112 may also be located remote from the premises, such as through the use of a cloud service and/or a mobile device so that various functions, features, and capabilities for monitoring and control of individual, or groups, of sensors and devices may be performed in a local controller, remote server, or in a user's mobile device as desired.

The devices of premises system 112 may, for example, detect and/or control door and window openings and closings, detect alarm conditions, notify people within an area about alarm conditions, track and/or control temperature, or accomplish other functions that may be desired. Such premises systems may be used within a boat, office suite, industrial building, residence, campus, or park—any location to be monitored. It should be understood that not all of such devices may be installed within a given system.

Sensors and devices may include at least one of a door contact, a window contact, a carbon monoxide detector, a smoke detector, a glass break detector, a motion detector, a video camera, an audio sensor, an accelerometer, a vibration sensor, a keypad, a pressure sensor, a humidistat, a temperature sensor, a fingerprint reader, biometric reader, an infrared image sensor, a vapor sensor, a wireless network router, a photosensor, a tamper switch, electromechanical actuator, a GPS device, active assets tag, passive assets tag, an embedded processor in an appliance, a glucose meter, a blood pressure meter, a personal emergency response system, PIERS, pendant, a wearable mobile device and a smart phone. One or more motion detectors may be used to sense motion and other alarm conditions, such as glass breaking, fire, smoke, temperature, chemical compositions, water, carbon monoxide, or other hazardous conditions. Video cameras may be used to detect motion and/or capture video of events. The sensors, motion detectors and video cameras generate sensor data for processing, as described herein. When an alarm condition is sensed, the system controller may transmit an alarm signal to one or more notification device, such as horns and/or strobes, for example. Heating, ventilation and air-conditioning (HVAC) controls, thermostats, remotely controllable appliance switches, wall switches, receptacles, and other home automation devices may also be used.

Smart Phone Application

In operation, portable system 102 may be placed in an "active mode." For example, a user may launch an app on a smart phone. The app may authenticate the user through a number of means, such as entering USER/PASS credentials, biometrics (e.g., facial recognition, voice authentication, fingerprint scan, etc.). The app may have a number of settings to alter the features and functionality as discussed below, including whether the system is to be place in an active mode manually by the user, automatically upon log-in, or upon the occurrence of a triggering event detected by portable system 102.

Once in an active mode, locator 228 may track the location of portable system 102 (and the user), and generate location information, i.e., device data. This may be accomplished by a number of means such as GPS, "pinging," or triangulation of the radio signal—the operation of these means in and of themselves is well known to those of ordinary skill and will not be further elaborated upon here.

Figure 4A:
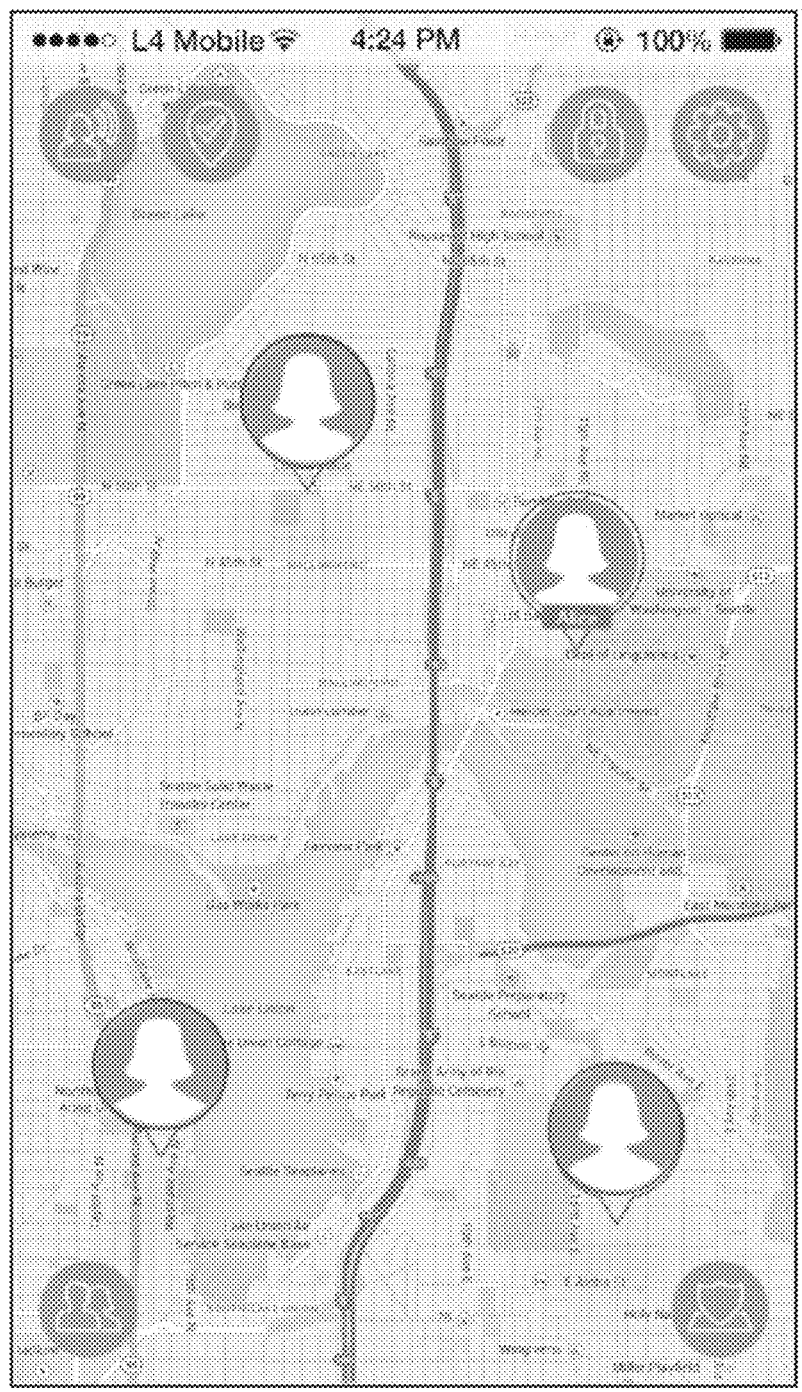
FIGS. 4(a)-(m) are pictures illustrating examples of the operation of a system employing the invention.

FIGS. 4(a)-(m) illustrate a user interface for and possible operation of portable system 102 using such an application on a smart phone. As shown in FIG. 4(a), a home screen may be part of the user interface to provide access to features of portable system 102 using graphical elements. All of the graphical elements used in such an application are preferably in accordance the design recommendations for any of the platform operating systems with which the app will be used (e.g., Apple's iOS, Google's Android, etc.).

In the illustrated embodiment, the application does not include any navigation bars or drop-down menus—using only the graphical elements for accessing the functionality and information provided by the application. This has the distinct advantages that it makes the application much more intuitive and easier to use. When a user is feeling unsafe, the intuitive nature of the design will allow for easy access to all features directly from the home screen, enabling the user to more quickly and easily activate a desired feature. In this example, there are separate graphical element for managing a group of designated users, for broadcasting a "shout-out" to the group, for providing a "check-in" to the group, for overlaying health and safety information based at least in part on the user's location, for accessing monitoring on demand and/or response on demand services, and for changing application settings—all of which are described in more detail below. Those of ordinary skill in the art will appreciate, however, that the design and number of graphical elements used, or the features accessible using those graphical elements is not limited thereto.

The home screen may also include a graphical element representing the user, which may be overlaid on a map with information showing the current location of the portable device (indicating the location of the user of that device). This map and overlay, in and of itself, may be generated (and updated) using conventional locating technology noted above and smart phone technology known to those of skill in the art, and the user may move the map by sliding his or finger around the screen, again using such smart phone technology (which may also update which other information of the types of discussed herein are displayed on the screen).

Figure 4B:
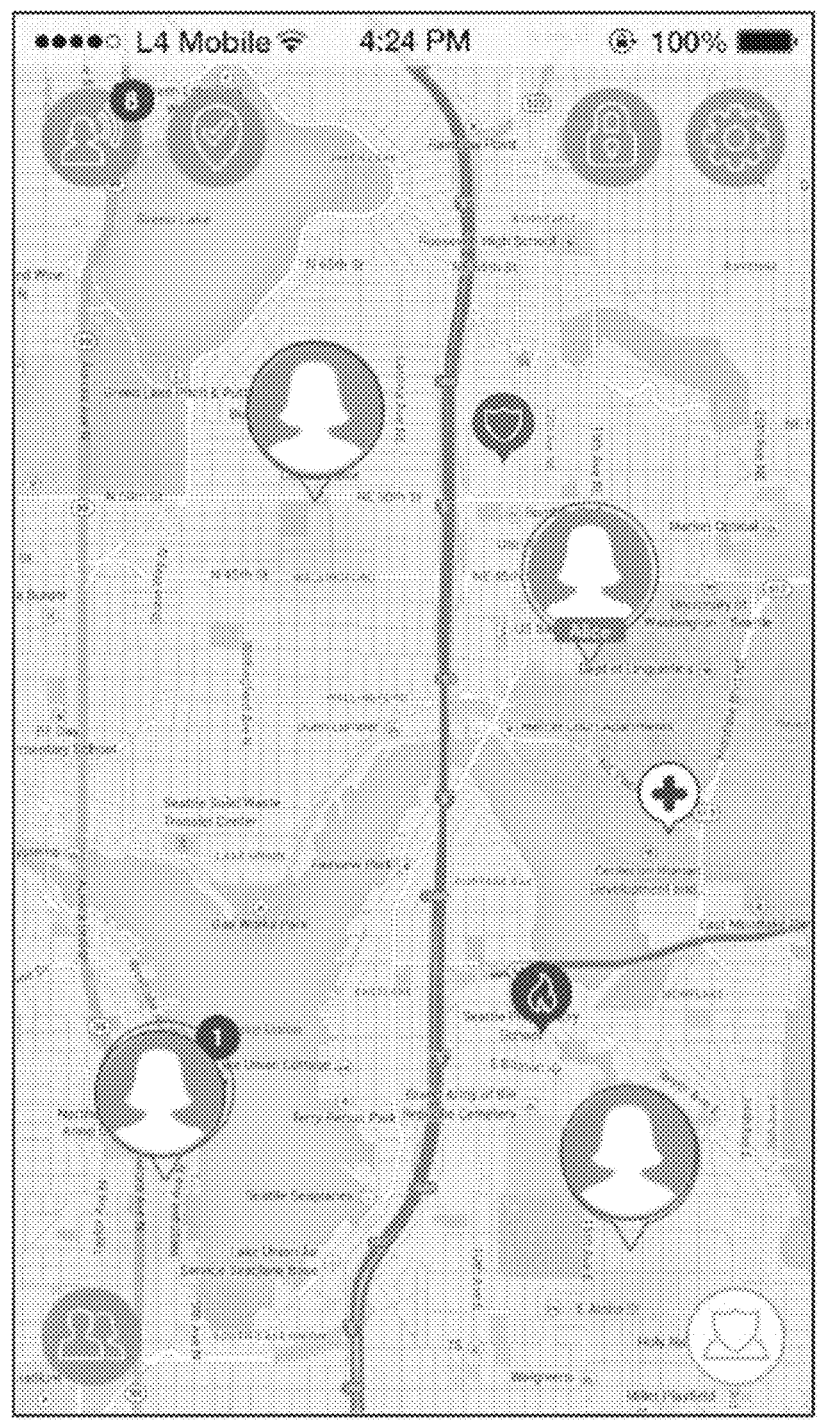

The overlay of information on the map may be accomplished using multiple layers—see, for example, FIG. 4(b), which adds an additional layer of information from FIG. 4(a). Use of layers allows a user to designate what they would like to see around them, and will allow for customization as to display of other information, such as graphical elements for health and safety information (such as emergency responders; e.g., police, fire, hospitals, local security/guards etc.), other relevant persons or facilities, and/or other relevant information for the area around the user's location (such as crime data and registered sex offenders—as well as any of the graphical elements for accessing functionality of the application. Each layer can become transparent (or removed altogether) by tapping on a portion of the map. The application may use GPS information to also display these overlays for the locations information for each type of information displayed.

Figure 4C:
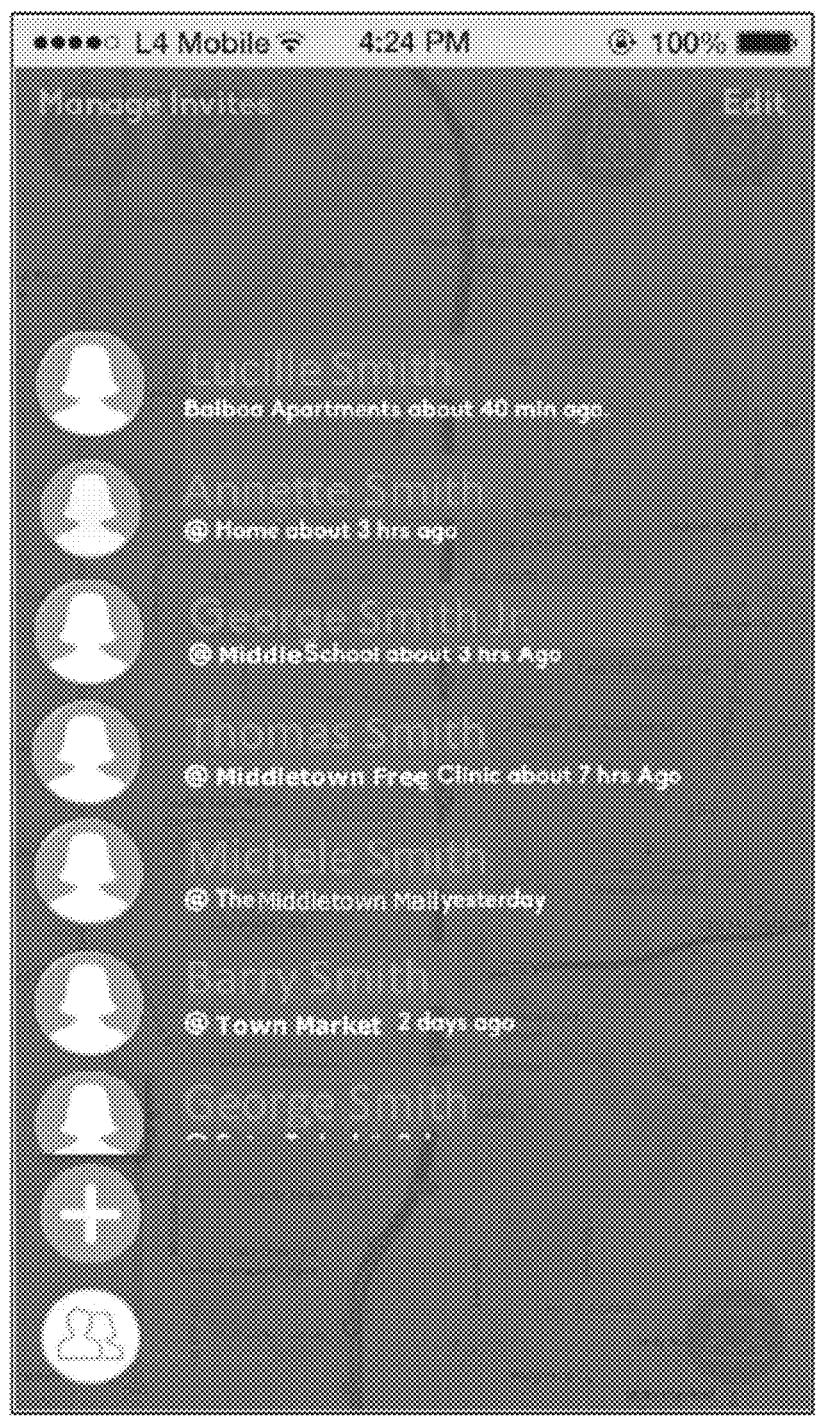
Figure 4D:
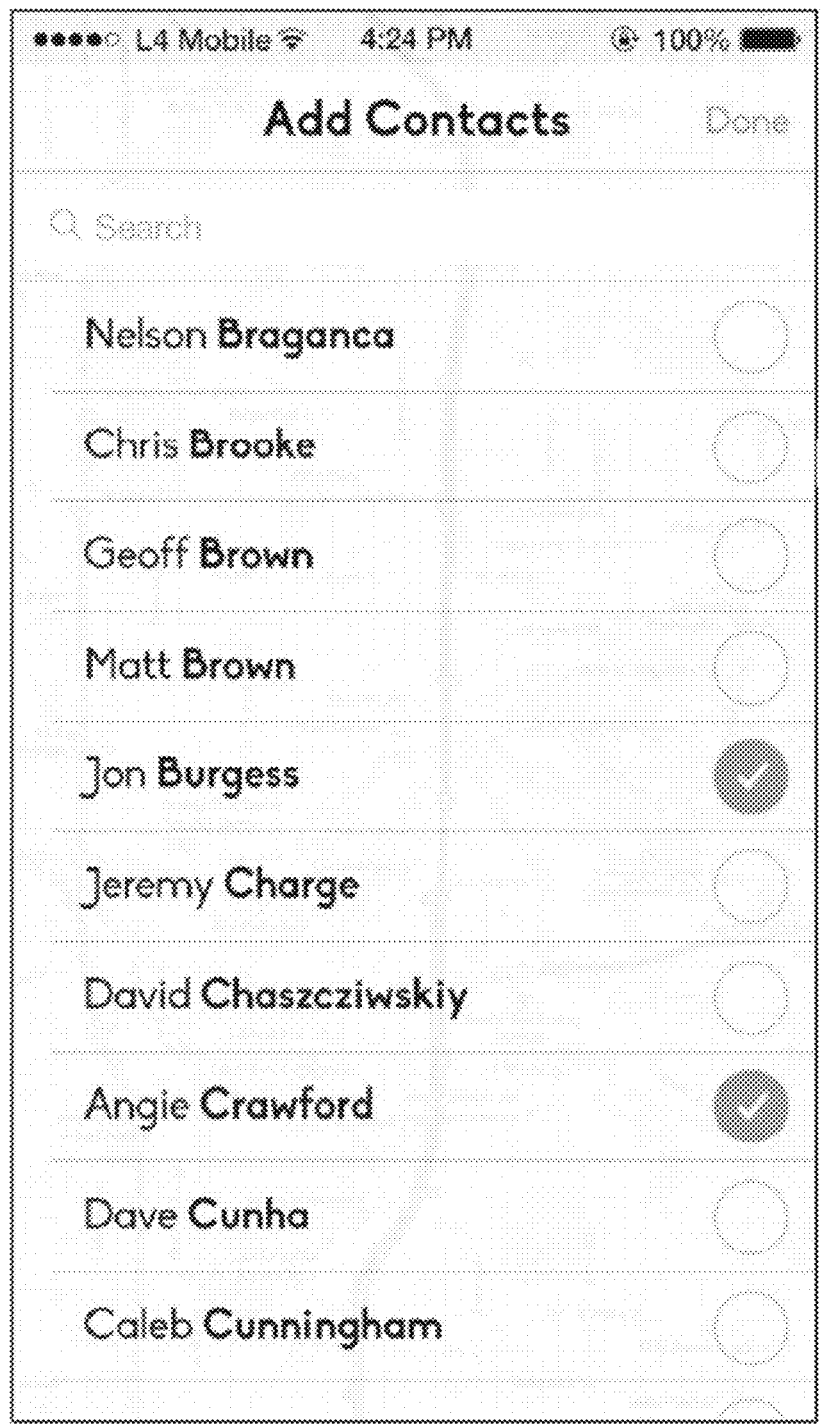

As noted above, the application may be used among a group of other users designated by the user. This group (or "circle") may be created, for example, by tapping a graphical icon from the home screen (such as the icon at the bottom left of the home screen), which causes the application to pull up a "Manage Invites" overlay that may list existing designated users that are currently in the user's circle (e.g., "friends"), invitations that have been received, and which invitations have been sent and accepted (or not accepted) by others, as shown in FIG. 4(c). The Manage Invites overlay may include a graphical element (e.g., the "plus" icon) for generating invitations to others. Tapping on the element causes the application to retrieve a list of contacts and their contact information s otherwise stored on the user's phone, as shown in FIG. 4(d) from which the user may designate contacts to invite to join the user's circle.

Figure 4E:
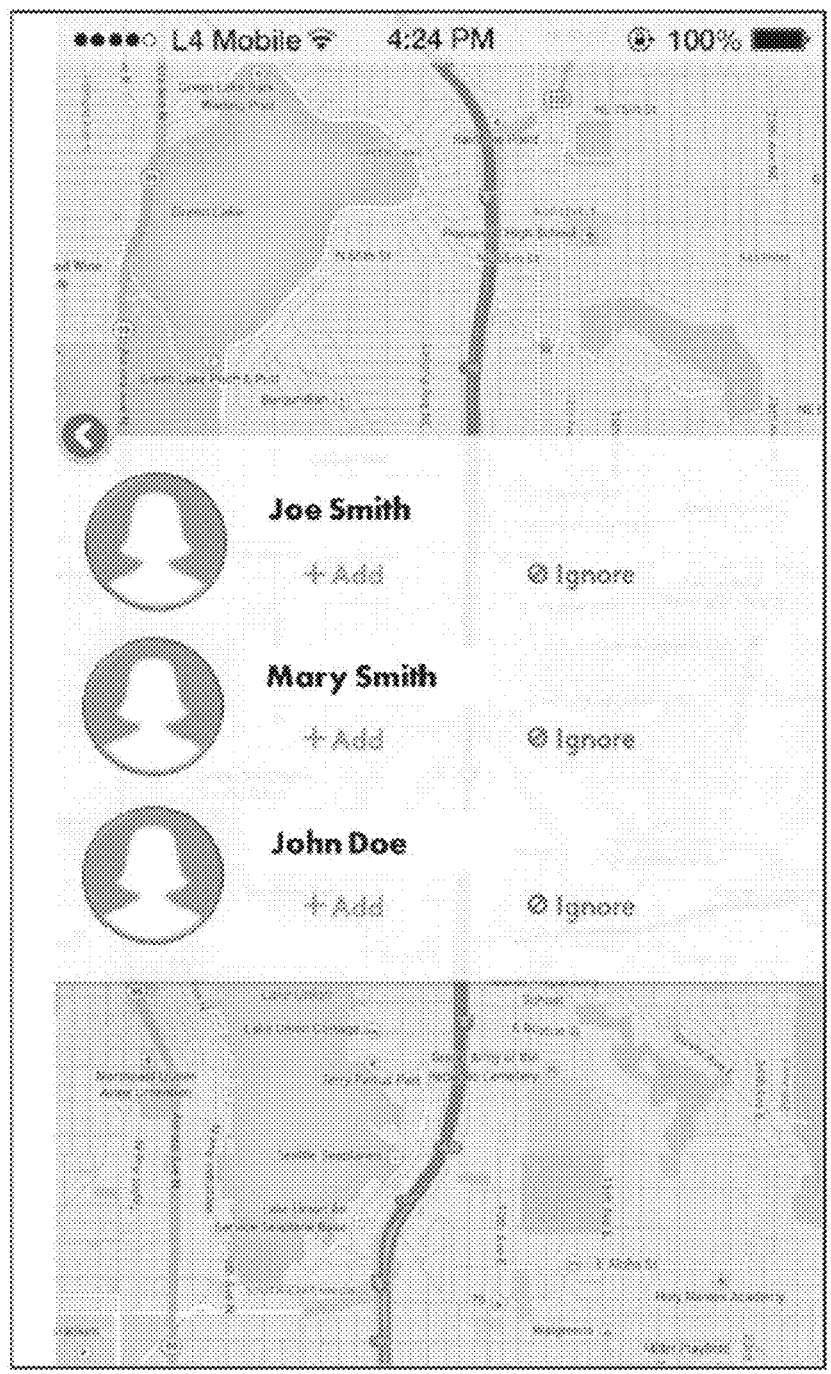

The application then sends an invitation request to a device for such other designated users based on their contact information and/or as further selected by the user (e.g., to a mobile number associated with the other user's smart phone, an email address for an account associated with a tablet, etc.). This could be accomplished, for example, via a text message—which also may prompt the other user to download the application of the invention if they do not currently have it installed on the associated device. Alternatively, the invitation could be sent to the other's user's copy of the application operating on their associated device. Such invitations would appear when the other user selects "Invitations" on their Manage Invites overlay, as shown in FIG. 4(e), and the other user can accept or ignore the invitation. If they accept, their application notifies the inviting user's application, which updates their information.

Users may also remove other designated users from their circle. For example, tapping the "Edit" element on the Manage Invites overlay may cause the overlay to enable the listed contacts to be removed by "swiping" across their name (or other similar means understood to those of ordinary skill in the art).

Figure 4F:
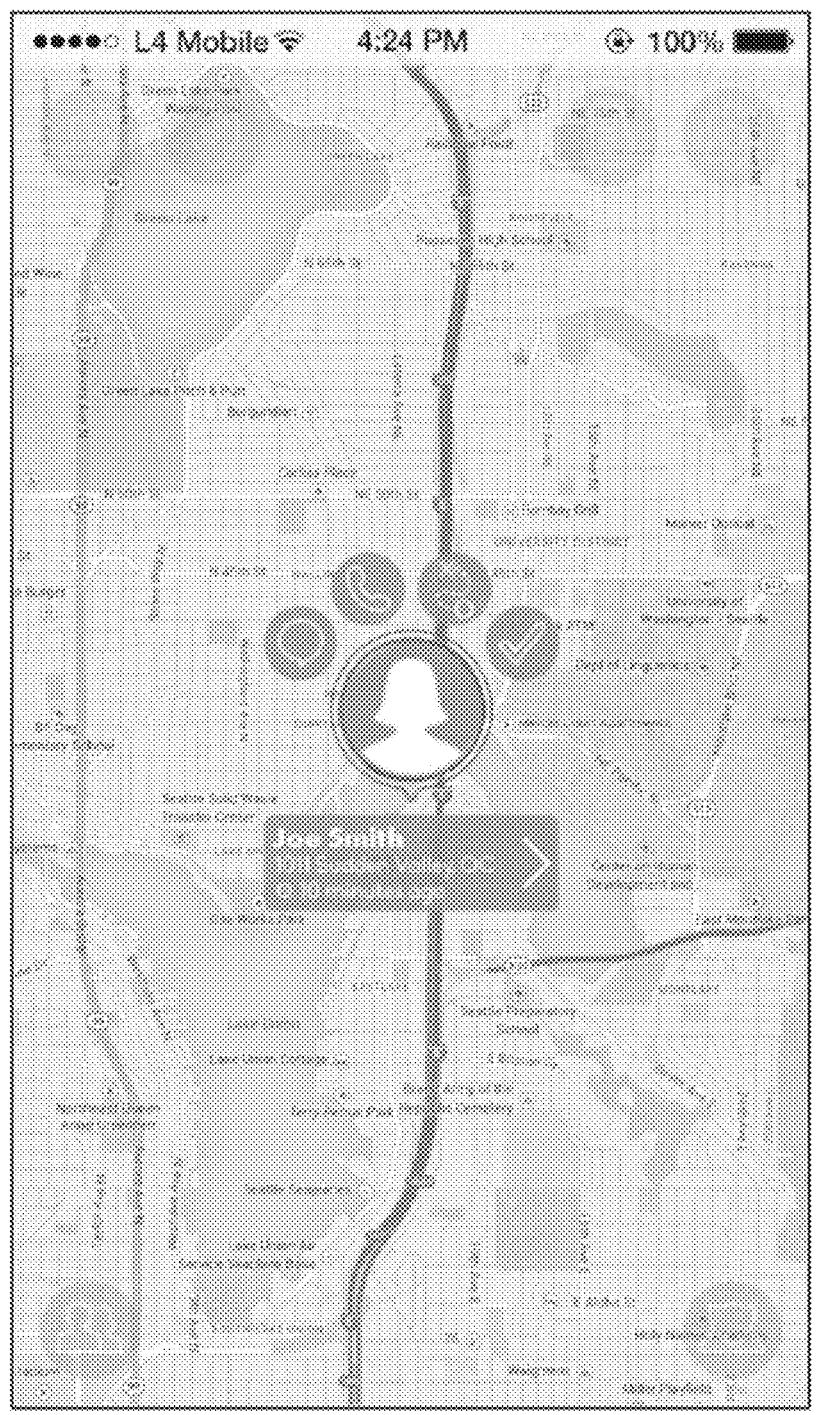
Figure 4G:
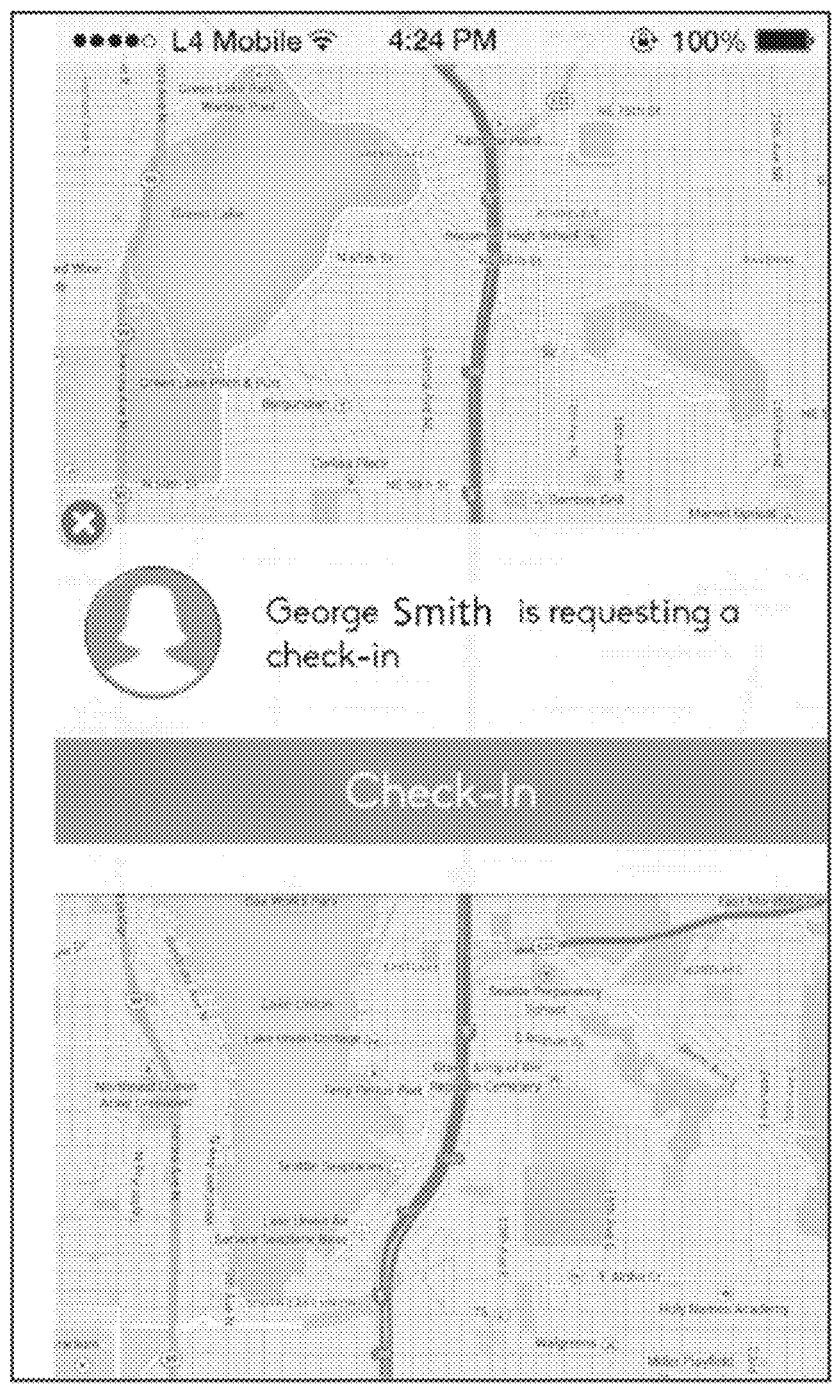
Figure 4H:
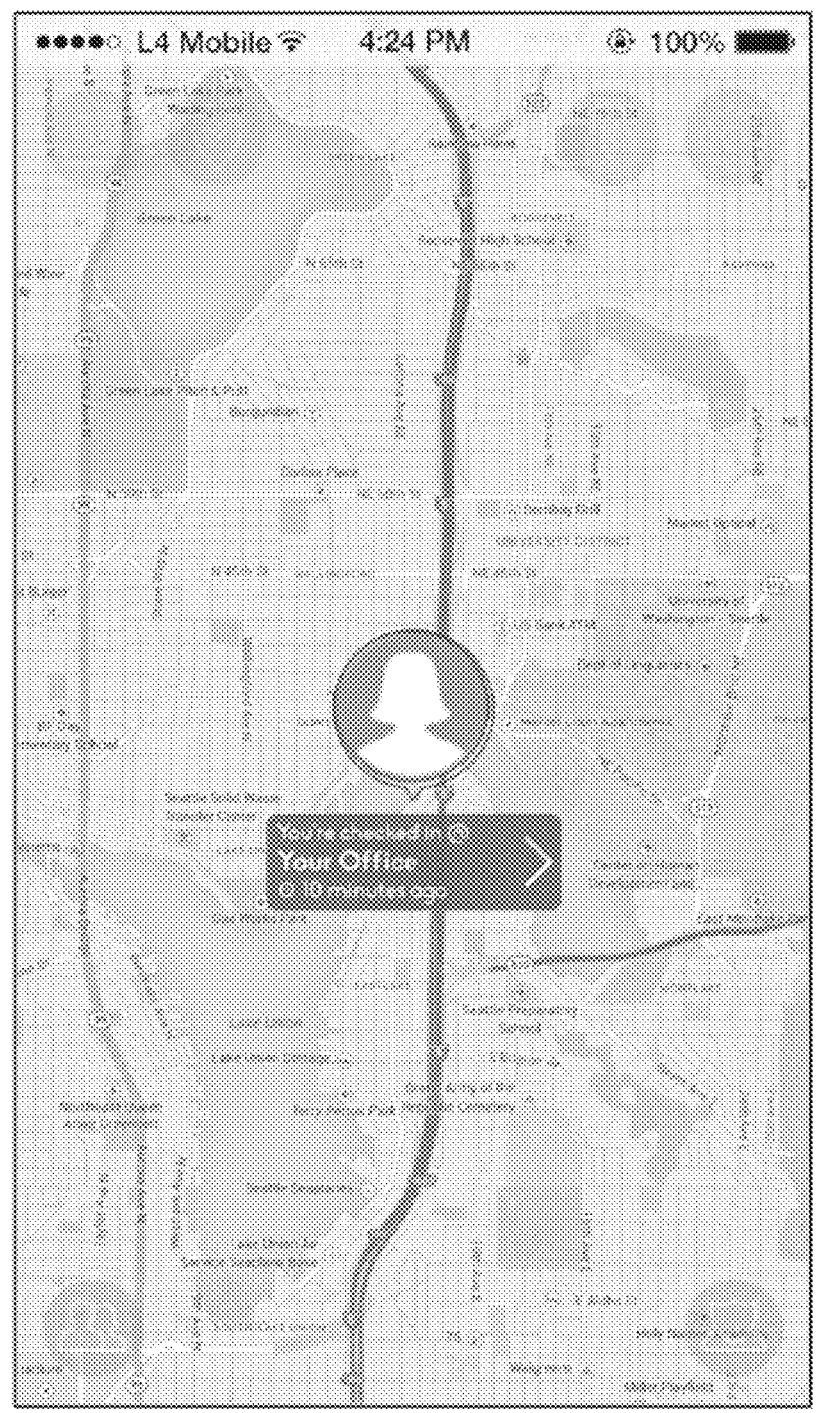

As illustrated in FIGS. 4(f)-(h), a user may select one or more specific contacts on the map, and may directly interact with them in a number of ways—within a corresponding copy of the application operating on that contact's own phone or other device, or via other tools on that contact's device (either within the base operating system or other applications capable of interacting with the application of the invention). For example, a user may touch the icon used as the graphical element for a contact (or a photo image used to personalize the element for that contact, such as an image stored on the phone with their contact information), prompting the application to generate an overlay of additional graphical elements associated with the contact. For example, FIG. 4(f) illustrates possible icons for text messaging with one or more contacts, placing a phone call to contacts using their contact information, generating directions and showing routes to that a contact's location, and sending the contact a "check-in" request. Of course, those of ordinary skill in the art will appreciate that the invention is not limited to those icons or features.

Tapping the "Check-In Request" icon prompts the application to generate a check-in request to the mobile phone or other device associated with that person's contact information on the user's smart phone (and/or as designated within the application)—pushing a message to a user to check-in, and provide a status indicating that all is well. If the contact is also operating a corresponding copy of the application of the invention on their device, this incoming message appears on the screen of the contacts copy of the application as shown in FIG. 4(g). The incoming message may also be configured to provide a pop-up notification on the user's phone, and/or activate the application from a suspended state to display the message, using features of the operating systems of such devices in a conventional manner. When a check-in request appears, the contact can confirm the check-in simply by touching the message. This may prompt the copy of the application of the invention operating on the contact's device to generate a. response to the copy of the application operating on portable system 102. When the response is successfully received, the user's application may provide indication of this to the user, such as by changing a feature, such as the color of the icon, for that contact as shown in FIG. 4(h).

Figure 4I:
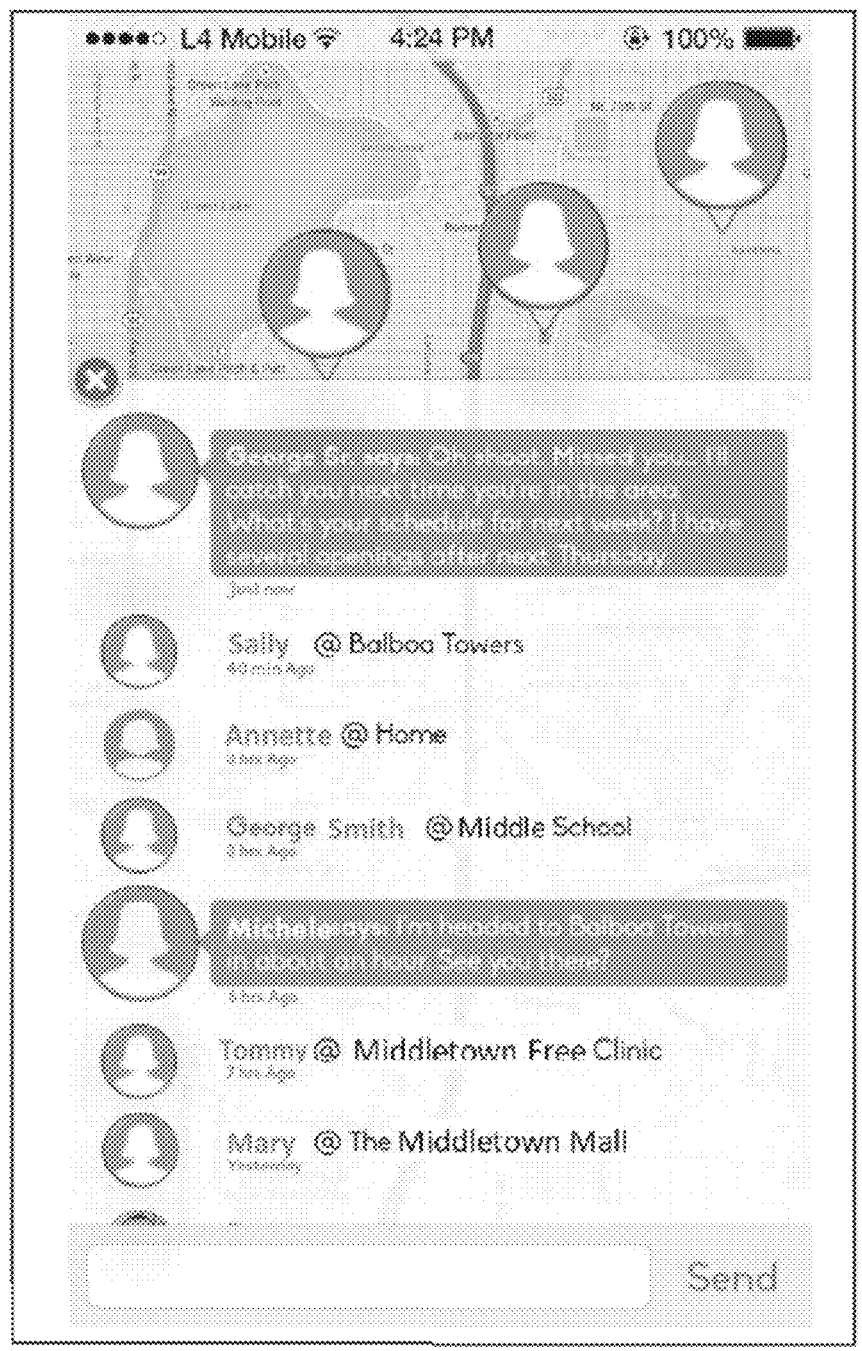

As noted above, the home screen may also include a graphical element for broadcasting a "shout-out" to some or all of the designated users in the group. For example, tapping the shout-out icon may cause the application to retrieve a list of all of the prior messages broadcast among the group, along with the ability to type and send a new shout-out message. This is illustrated in FIG. 4(i). This feature provides the ability for a user o quickly send a "blast" message everyone in their circle.

Figure 4J:
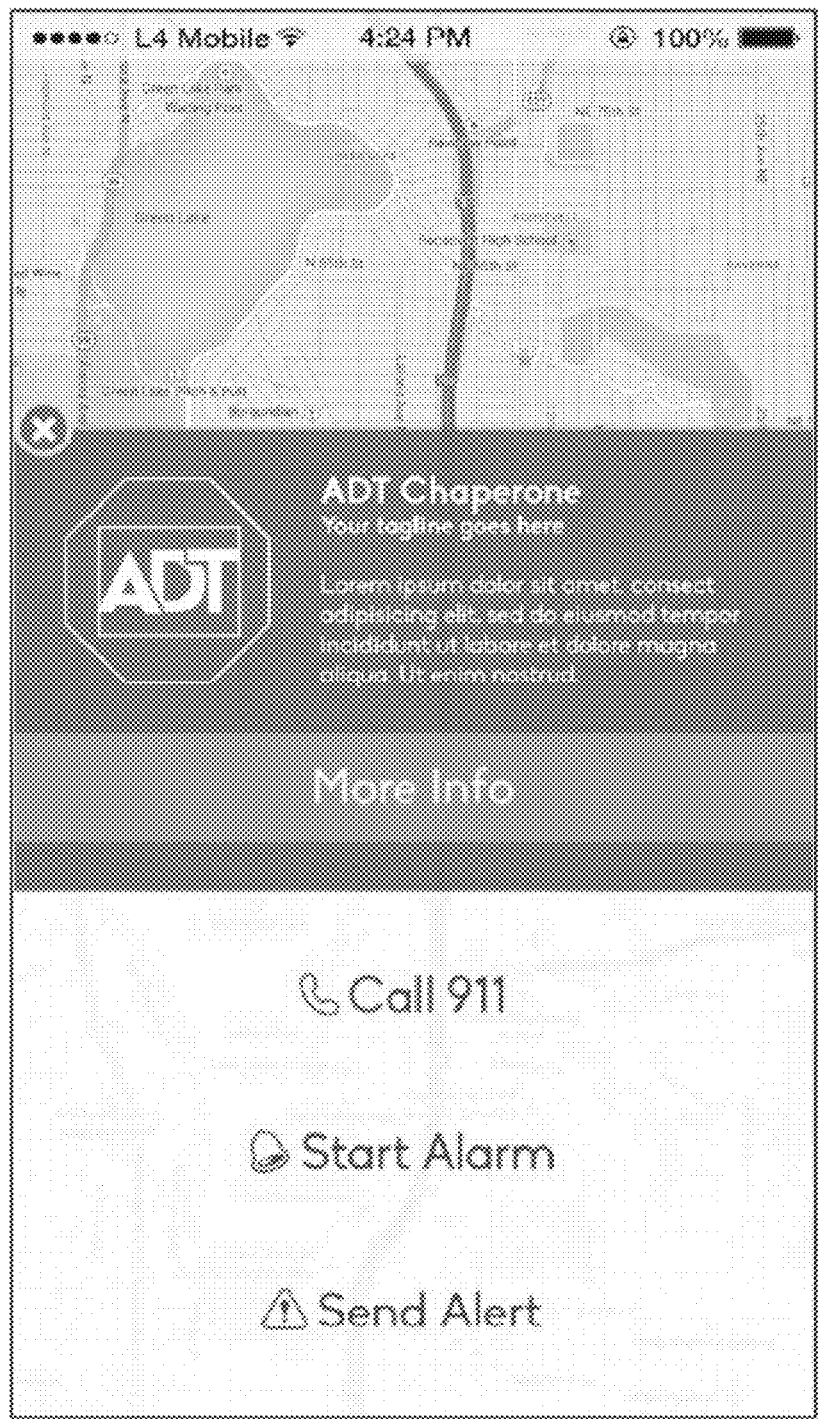

One of the benefits of the invention is that it may also incorporate certain additional security related options into such a smart phone application. Various options for these features may be pre-configured by the user. As noted above, the home screen may include a graphical element for accessing such options, For example, tapping on the icon may cause the application to retrieve an option screen overlay as shown in FIG. 4(j).

Figure 4K:
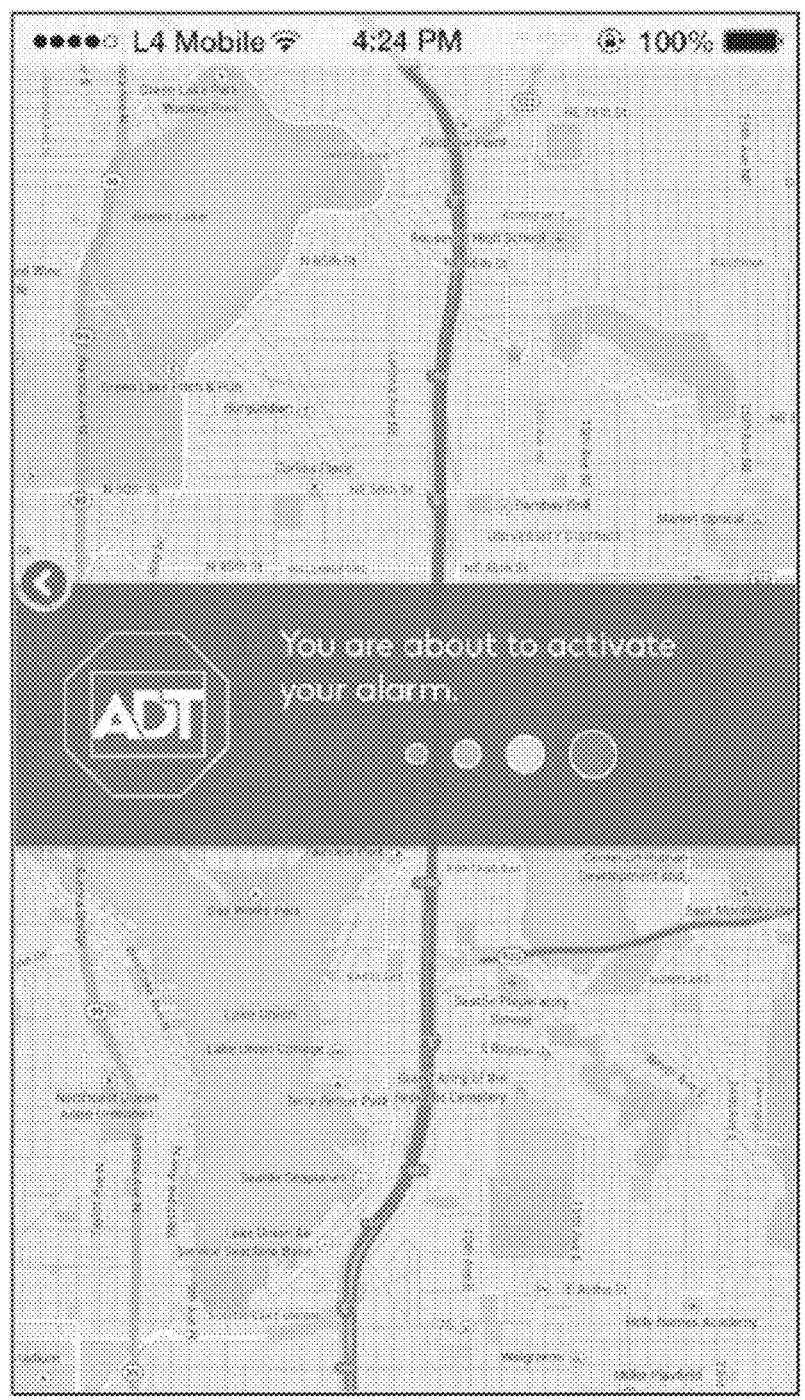

In accordance with the invention, the application may also include different "panic button" features. For example, when the user taps on "Send Alert", the applications may send a message to a list of recipients or designated users, both of which may be pre-determined by the user in the option settings. When a user taps on "Start Alarm" the application may cause the user's phone to emit an alarm, such as an audible alarm from the phone's speaker and/or flashing the light on the phone, etc. (i.e., using actuator 212 of portable device 102). Optionally, the user may configure this feature for a slight delay (e.g., 5 seconds, 10 second, etc. to provide the user an opportunity cancel the activation of the alarm. The application could also display a notice indicating the elapsing of this delay period, such as is shown in FIG. 4(k).

MOD/ROD

Figure 4L:
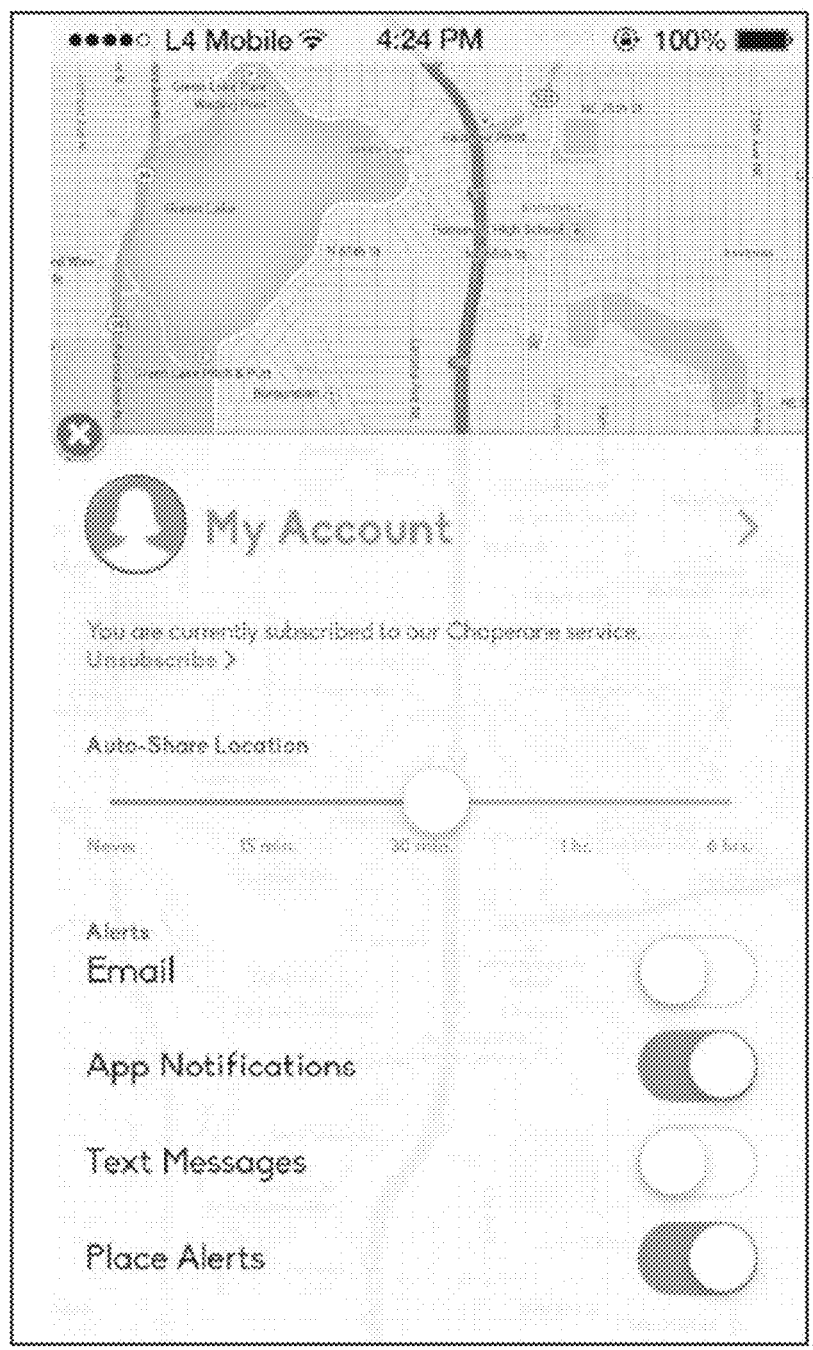

The security options may also include access to MOD and ROD capability—described in more detail below. If a user determines that be or she is in a location or situation that may be or become unsafe, the user can manually initiate an MOD service (i.e., using user input 226), such as by tapping on "ADT Chaperone". Alternatively, the application, via processor 214, may place the phone automatically in MOD mode based on configuration settings and "situational information" or situational data generated from the detection of certain events, i.e., receipt of sensor data, by sensor input 224 (e.g., the accelerometer on the phone detects certain sudden movements of the phone, or a certain pattern of movement, or the microphone detects certain sounds that may indicate a car accident or a gunshot, etc.) Various aspect of MOD/ROD service may be configurable by the user, as illustrated in FIG. 4(l).

Figure 4M:
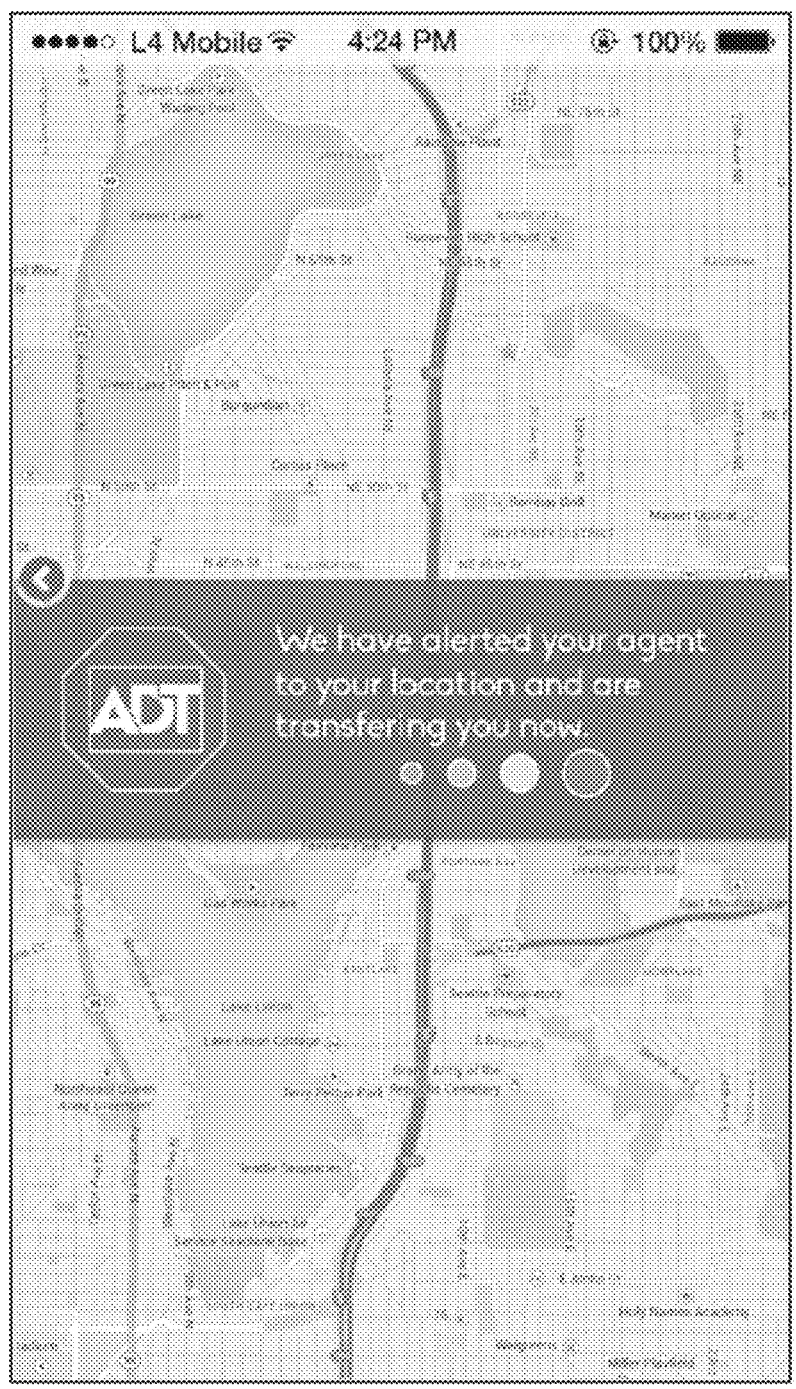

Upon entering MOD mode, the application may connect portable system 102 with a security monitoring center (e.g., remote service site 106), which is staffed with trained operators who can monitor and assist the user. The system may generate a notice for the user indicating that the user is being connected, such as shown in FIG. 4(m). Portable system 102 may establish a voice channel connection between portable system 102 (e.g., a cellular call from a smart phone) in order for the operator o exchange information with the user, to assess and monitor the situation, and take further action were warranted.

Input component 220 may generate additional situational information about various characteristics of the environment proximate portable system 102 and the user. This situational information could be a wide variety of data in any number of forms (text, audio, video, movement vectors, etc.) provided manually by the user via user input 226, generated by sensor input 224, and/or generated by processor 214 based on pre-determined information stored in memory 218.

For example, an app operating on a smart phone may generate a timestamp; or may retrieve identifying or other stored information about the user, a standard text message (e.g., "please listen," "please watch"), or any other desired information available to the app that could be of use in effectuating monitoring of the phone and the user by the monitoring center. The phone could also enable the user to type a note such as "heading to car now—it's dark" on the phone's touch screen, and/or prompt the user to select from a number of pre-determined messages. Alternatively, the app may also initiate the microphone and/or video camera to record or begin streaming, or the phone to record/stream the speed and direction of movements detected e phone's accelerometer based on the system configurations (or enable the user to manually select what gets recorded).

Processor 214 may then generate portable device information, i.e., situational data, based on the location information, i.e., device data, and the user information such as sensor data, and may use communicator component 202 to transmit at least a portion of this information to remote service site 106 via network 104. In a smart phone, for example, the app may initiate a phone call, video conference, SMS, push notification, email, etc. (or a combination of such transmissions) that can provide the user's location, status message/information, audio/video/motion data, and/or initiate voice/video communications.

The portable device information may be received at remote service site 106 via system interface 304 (e.g., update/status information communicated between portable system 102 and remote service site 106 without user intervention) and/or via user interface 302 (e.g., voice/video communication with the user, information uploaded/downloaded by the user, etc.) This information may be managed by data management platform 310 and stored in a database as user data 312 and/or system data 314, depending on the nature of the information. The information may also be analyzed or otherwise processed by software operating as analytics engine 308 (either alone or in combination with other previously received/stored information—such as for taking automatic information based on a programmed and configured procedure and/or for presenting to the operator via operator interface 306 (i.e., a computer terminal, telephone set, video camera, and/or other similar device) for action by the operator.

The operator may retrieve (or is automatically provided) with account and other identifying information about the user, other users in their group, the user's location, and any other recorded/streaming situational information. A significant advantage of the invention is that an operator may monitor and assess the user's situation using situtional data provided by the phone even if the user is, or becomes, unable to communicate with the operator.

Based on the situational data or portable device information (particularly the location information), user data 312, and/or system data 314, the operator and/or analytics engine 308 may determine an appropriate first responder for the user's current location and situation—e.g., whether the user may need police, fire, paramedic, and/or other emergency response personnel and which source(s) of such personnel (municipal and/or private service) could most quickly respond.

For example, the operator may determine (from a text, audio recording/user comment, video stream/recording, etc.) that the user is walking alone across a dark parking lot at night in a particular shopping mall. The operator may access system data 314 to find the contact information for the local police department and/or the security guard service or office for the shopping center. Alternatively, this information could be auto-generated by analytics engine 308 and provided to the operator via operator interface 306, or stored pending whether the user, the operator and/or analytics engine 308 determines that such first responder should be contacted. Analytics engine 308 may make this determination, for example, using audio/video analytics or other da ta analysis and programmed parameters for response.

Remote service sit 106 may generate service site information based on the above, at least a portion of which may be provided back to portable system 102—such as the contact information for first responder site 108, which may be used by portable system 102, for example, to directly send location information, e.g., device data, and/or user situational information, e.g, sensor data. Or, a message may be outputted through user output 210 that their safety is now being remotely monitored by the service center (e.g., a graphic or message on the display of their phone).

Thereafter, portable system 102 may engage in an ongoing exchange and updating of any of the above types of information via communicator 202. For example, an operator may talk to the user and reassure her until her situation has become more secure. Alternatively, or in addition, the user and portable system 102 may continue to stream video movement data, etc. to the monitoring center for software analysis or analysis by an operator. In one embodiment, processor 214 is configured to determine whether a personal event has occurred based on at least one of the premises sensor data and device sensor data. The personal event corresponds to an event occurring proximate the portable user device. Processor 214 is further configured to determine whether a premises event has occurred based on at least one of the premises sensor data and device sensor data. The premises event corresponds to an event occurring at the premises. The personal event and/or premises event includes at least one of a medical event, intrusion event, fire event, gas event and water event. Processor 214 is further configured to generate situational data in response to determining at least one of the personal event and premises event has occurred. The situational data is based on at least one of the premises sensor data and device sensor data. Processor 214 is further configured to cause the communicator 202 to transmit the situational data to at least one of the first responder site 108 and remote service site 106. The situational data indicating that the at least one of the first responder site 108 and remote service site 106 are authorized to act on behalf of a user of the portable user device 102.

When analytics engine 308, the operator, portable system 102, and/or the user determines that a first responder is needed, service site 106 may contact one or more first responder sites 108. As with communication to and from the user, this may also be a phone call (or three-way call with the user on the line), video conference, SMS, push notification, email, etc. (or a combination of such transmissions), depending on how first responder site 108 is equipped. This could occur "manually" (such as if the user says be needs help, or the operator sees something on the video stream, or movements of the phone indicates a struggle, a car accident, or the like) or "automatically" (such as if processor 214 and/or analytics engine 322 are monitoring situational information "in the background" and similarly determine that something has occurred).

Alternatively, portable system 102 may initiate contact with first responder site 108 directly. For example, the first responder information received by portable system 102 as service site information may be presented on the display of the user's phone with the aforementioned "panic" button(s) (or just "embedded" with a panic button), so that the user may initiate a transmission directly to first responder site 108. This direct transmission could be a three-way phone call, for example, with the operator at the monitoring center still on the line, or it could be another type of transmission of information as previously described (if the first responder site is equipped in a manner similar to remote service site 106).

An emergency operator (and/or analytics engine 322) may dispatch a first responder to the scene. This may be accomplished using the first responder's procedures for dispatching personnel and/or an assessment of the service site information that it received in a manner similar to the assessment/analysis done by the service site as described above. Using user contact information provided in the service site information, the first responder site may enable the exchange of ongoing exchange of information among the user, the first responder, and service site 106. Or, the first responder site may provide/forward the contact information to the first responder so that the first responder may engage in such communications directly.

Portable system 102 may also employ the capabilities discussed above to operate in an ROD mode, without user interaction with a monitoring center and an operator. In ROD mode, the portable system 102 may automatically contact remote service site 106 on an ongoing so that service site 106 may periodically push updated first responder information to portable system 102 that is based on the current location of portable system 102 and/or other situational information sent to remote service site 106. Similar to the MOD mode, this information could be displayed on the user's phone or embedded into a panic button graphic. In ROD mode, when the user presses the panic button, they are connected directly to first responder site 108 (and an emergency operator) and an operator from remote service site 106 is not otherwise directly involved. Alternatively, portable system 102 may automatically contact the first responder based on a sensed condition.

The MOD/ROD communication capabilities discussed above may be extended to other designated users in the group as well. For example, in addition to exchanging information with, or being on a call with, a monitoring center, the user's smart phone, or the monitoring center, can also communicate with other users in the group in the same ways as with emergency responders. These communications could include any of the information and communication means discussed above or others. A given user could also have "tiers" of user so that, based on configuration settings different types of information could be provided to different tiers of users based on different situations as determined by portable system 102 and/or remote service site 106.

The manner of use of any situational information generated by portable system 102 may also be configurable by the user as option settings. For example, audio or video generated while in MOD mode may be stored locally in portable system 102 but not communicated to remote service site 106, first responder site 108, and/or any of the other users in the group unless the user manually authorizes its transmission or does not cancel the transmission within a predetermined delay period (such as by tapping a graphical element within one of the application overlays). This has the benefit of enabling portable system 102 to still collect situational information that can be of value in assessing the user's situation, why also allowing the user to prevent the transmission of such information if he/she determines that it is unnecessary (and the user is concerned about privacy related to such information).

Premise and Local Area Security & Surveillance

As shown in FIG. 1, the invention may also incorporate security, control, and information gathering about a location, such as a home (shown), a business, a vehicle or mobile home, or any selected area in need of protection. Various sensors and other peripherals 112 at that location may be used in connection with portable system 102 for this purpose. As previously noted, example of such sensors 112 that generate sensor data is not particularly limited and may include any number of health, safety, and lifestyle devices—such as video cameras, carbon monoxide sensor, motion detectors, glass break sensors, water, gas, and smoke detectors, door and window contacts, various medical condition monitors and personal emergency response systems, thermostats, audio sensor, accelerometer, vibration sensor, pressure sensor, humidistat, temperature sensor, fingerprint reader, a fingerprint reader, biometric reader, an infrared image sensor, a vapor sensor, a wireless network router, a photosensor, a tamper switch, electromechanical actuator, a GPS device, active assets tag, passive asset tag, an embedded processor in an appliance, a glucose meter, a blood pressure meter, a personal emergency response system, PERS, pendant, a wearable mobile device, smart phone, appliance modules, key fobs, keypads, and touch screens, a gateway router, and/or a security panel, etc.

In operation, these peripherals may send information or sensor data (an alarm event, a status update, video feed, etc.) to a local security panel and/or gateway, e.g., control device, and/or that information may be communicated to a remote monitoring center (such as remote service site 106), where it may be stored, analyzed, and/or provided to an operator for further action in a manner similar to as previously discussed. In addition, such information could be provided to a portable system 102 for use by the user, and the user can submit instructions/commands/requests for additional information back to the security panel, gateway, and/or peripheral though remote service site 106. The user may also employ portable system 102 (or a second portable system 102) to interface with a security panel and/or or a gateway in order to program, control, and configure those systems, or how those systems control or interact with other peripherals (or directly communicate with one or more peripherals without the use of a local control device).

In another embodiment, a portable system 102, itself, may be used as a security panel and/or gateway for controlling and interacting with peripherals 112 either via a local network of global network 104. Some capabilities for control and interaction by portable system 102 may also use remote service site 106. Peripherals 112 may use a variety of wireless communication protocols. Some home automation devices use protocols developed for home automation, like X10, Z-wave and ZigBee, while others use more general wireless protocols such as and Bluetooth. Health monitoring devices may use Bluetooth and Wi-Fi (or may be adapted for home automation protocols). For a number regulatory and safety reasons, and for business reasons, a number of peripherals for fire and security use protocols that are proprietary to particular product manufacturers. A software application operating on microprocessor 214 may communicate wirelessly with peripherals 112 through local communicator 204 using any of the above noted protocols (where local communicator 204 contains the necessary chips/firmware for such communications, or via an additional radio communicator capable of translating the communication protocols contained in local communicator 204 to the protocols used with such devices).

In one embodiment, processor 214 is programmed to utilize the user interface 226 to enable the user to use a graphical element to establish communication with at least one of the alarm event operator, the remote service site 106, a first responder and a first responder site 108. In one embodiment, memory 218 is configured to store a plurality of service profiles. Each of the plurality of service profiles define rules for: monitoring for at least one of the personal event and premises event, automatically communicating situational data to the at least one of the first responder site 108 and remote service site 106 and responding to the at least one of the personal event and premises event. A determination whether the personal event and premises event occurred and a transmission of situational data are performed in accordance with the rules defined in a service profile being implemented by the portable user device 102. The service profile that is implemented by the portable user device 102 is selected by a user of portable user device 102 and/or automatically selected by the portable user device 102 based on at least one of the premises sensor data and personal sensor data. The plurality of service profiles may be configurable by a user of portable user device.

In one embodiment, memory 218 is further configured to store a list of contacts. Each service profile defines: at least one contact from the list of contacts to notify in response to the at least one of the personal event and premises event and a type of situational data to provide to the at least one contact in response to at least one of the personal event and premises event. In one embodiment, processor 214 is further configured to: determine a location of the portable user device 102 and automatically select one of the plurality of service profiles to implement based at least in part on the determined location of the portable user device 102.

An application operating on a smart phone or tablet, for example, typically contains Wi-Fi and Bluetooth for communicating directly with any peripherals capable of using that protocol, and can use the aforementioned gateway for "translating" such protocols to Z-wave or other specific protocols—either locally or via an exchange with the servers operating on remote service site 106. Encryption and other security-protection technologies may also be used to help ensure that such communications are not "hacked" to allow unauthorized persons to gain access to the data/video being communicated, or to control portable system 102 and/or peripherals 112. In one embodiment, processor is further configured to cause the portable user device to automatically synchronize with the at least one premises sensor at the premises to initiate receipt of premises sensor data. In one embodiment, processor 214 is further configured to determine a location of the portable user device 102. The automatic synchronization with the at least one premise sensor 112 occurs in response to determining the portable user device 102 is proximate the premises.

Upon detection of an event, the smart phone/tablet may communicate with remote services site 106, may trigger a local alert via actuator 212 (such as previously described), and/or may enable an operator at remote services site 106 to use the camera (and/or the microphone) in the manner previously described to observe what is happening in the environment proximate the device to manually verify what is occurring (e.g., an unauthorized entry, a fire, a medical event—or a "false alarm" as to any other these) in the manner previously described. Alternatively, or in addition, portable system 102 may also notify the user directly, and the user may similarly access the device as well to observe what is occurring. This can be separate from the operator at remote services site 106, or as part of a "three-way" communication (or "four-way" if first responders and first responder site 108 are also included). As part of such communications, the system may also establish two-way audio/video connection with portable system 102 at the location be monitored, so that the operator, user, and/or first responder could communicate with persons at that location to verify a situation, provide instruction, etc. As previously described, software and other technologies for using a smart phone or tablet for establishing such audio/video communications between two parties or among multiple parties generally are already known in the art and will not be further elaborated upon here.

Figure 5:
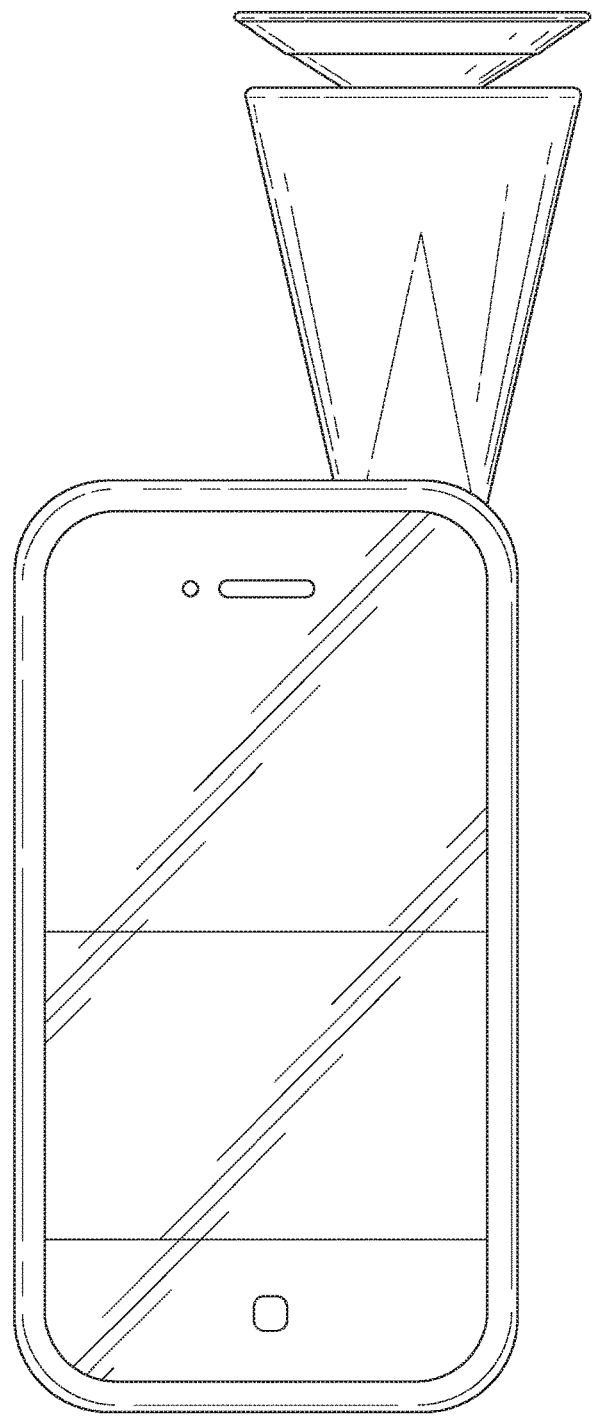
FIG. 5 is an illustration of a self-contained security system in accordance with aspects of the invention.

In yet another embodiment, portable system 102, itself, may be used as a "self-contained" security system, using its on-board sensors (e.g., camera, microphone, and accelerometer) as part of sensor input 224 for generating sensor data. For example, in the case of an application operating on a smart phone, the onboard camera may be used for motion detection, facial recognition, video analytics, etc. Enhancements (such as the 360° lens shown in FIG. 5) may also be used to improve the reliability, accuracy, flexibility, and ease of use of such a system. A smart phone with such a lens, for example, could be placed anywhere in room or other area to be monitored. Conventional image "flattening" technology may be used for viewing anywhere within the field of view of the camera. Upon the detection of any event, it may open communication with an operator at remote services site, the user, and/or first responders as previously discussed.

All of the above capabilities could be user selectable (such as manual/automated detection, type of communication and with whom, etc. to enable customizable MOD/ROD for the user to monitor for personal events, premises events and/or other types of events occurring at a desired premises and across the user's various circles of users.

"Smart" System

In addition to the features and functionality described above, the invention may also contain the capability for analytics that create a "smart" system that can analyze what is happening with the user and/or an area being monitored (and perhaps combine that with other available data) in order to anticipate information that the user (operator, and/or first responder) may want or need—making or proposing settings for the system, for example.

An illustration of how the system of the invention may operate in this manner is further illustrated in FIGS. 7(a)-(e). In the example shown in the figures, portable system 102 presents the user with an elegant, intuitive "dashboard" that enables the user to securely manage his/her physical digital life and assets as described herein. In this example, the tablet interfaces via the user's local area network and the Internet to remote service site 106.

When the user selects the "home" icon," an application operating on portable system may obtain (or refresh) data about the user via network(s) 104 (perhaps through a Wi-Fi router or other network gateway). Portions of this personal data may be stored in user data 312/system data 314, separately in the respective data sources of information providers 109 (having technology and functional components similar to that used with remote service site 106 and first responder site 108), locally in the portable system 102, and/or in some combination thereof. User and system data may include data specific to multiple users and their systems. Data management 310 coordinates the assembly and transmission of this user data among the other portions of the system.

The system provides the user with a high level of awareness of his/her personal and/or system information. By connecting various data points, such as situational information, alarm event/home automation/home health data with information from information providers (e.g., social media, calendars, etc.), the system may also present users with additional data that provides them with insights about what their personal data may mean to them so that the user's data is provided to him/her in a format that is contextually relevant to him/her—and more than just an assemblage of raw information—which enables the user to make better use of the information. This insight data may be stored in the various locations noted above may be produced by analytics software forming part of analytics engine 308. Those of ordinary skill in the art will appreciate that some or all of the analytics may also be within portable system 102 and not necessarily in remote service site 106.

In operation, various types of information may be inputted (in ways well known to those of skill in the art) into an algorithm within software operating on a processor within analytics engine 308. This algorithm takes this inputted information and produces outputted insight data for the user. This insight data may be stored via data management 310 and may be further processed and/or filtered by analytics engine 308 to be provided to the user through user interface 302. In one embodiment, communicator 202 is further configured to receive insight data in response to the transmitted situational data. The insight data provides analysis of the situational data based on a tracked history of the portable user device 102. The insight data may include at least one score. If processor 214 determines a personal event has occurred, the at least one score may indicate a security level of an environment proximate the portable user device 102. If processor 214 determines determination is made the premises event has occurred, the at least one score indicating a security level of the premises.

In one embodiment, processor 214 is configured to: track a history of determined personal events and premises events and generate insight data. The insight data provides analysis of situational data based at least in part on the tracked history of the personal events and premises events. Actions taken by (or inputted by) the user, situational information or any other data collected by portable interface 102, and/or information transmitted from an information provider 109 are processed through user interface 302. and/or system interface 304, to be collected in remote service site 106 as personal data that is "behavioral" data about the user. Analysis of this data by analytics engine 308 may also be captured as behavioral data (and stored, for example, in user data 312).

The information inputted into analytics engine 308 for generating insight data may include, for example, a combination of different types of personal user data, predetermined system criteria, behavioral data for the user, user determined criteria, and/or other types of data. The invention is capable of inputting a mixture of different formats of personal data into analytics engine 308, such as video data analyzed along with text, and analyzing this data to output the insight data. Analytics engine 308 can use video analytics (e.g., facial recognition, motion detection/boundary conditions, object tracking, etc.) to draw information from video to be used in generating insight and behavioral data—such analyzing video of the user, and/or family, friends, pets, etc. to generate insight data.

In one example, as shown in FIG. 7(a)-(e), the user may be provided with insight data regarding security information (such as "Kristy & Ryan Arrived Home") that is based on a mixture of personal data (such as an event record from the security system that a door was opened, and perhaps video of the event with or without facial or other biometric identification), other data (such as GPS information on the location of Kristy & Ryan). The security information in this example may be provided a format that is contextually relevant to the user (such as showing what is happening with the family, and that they are safe and secure).

Figure 6:
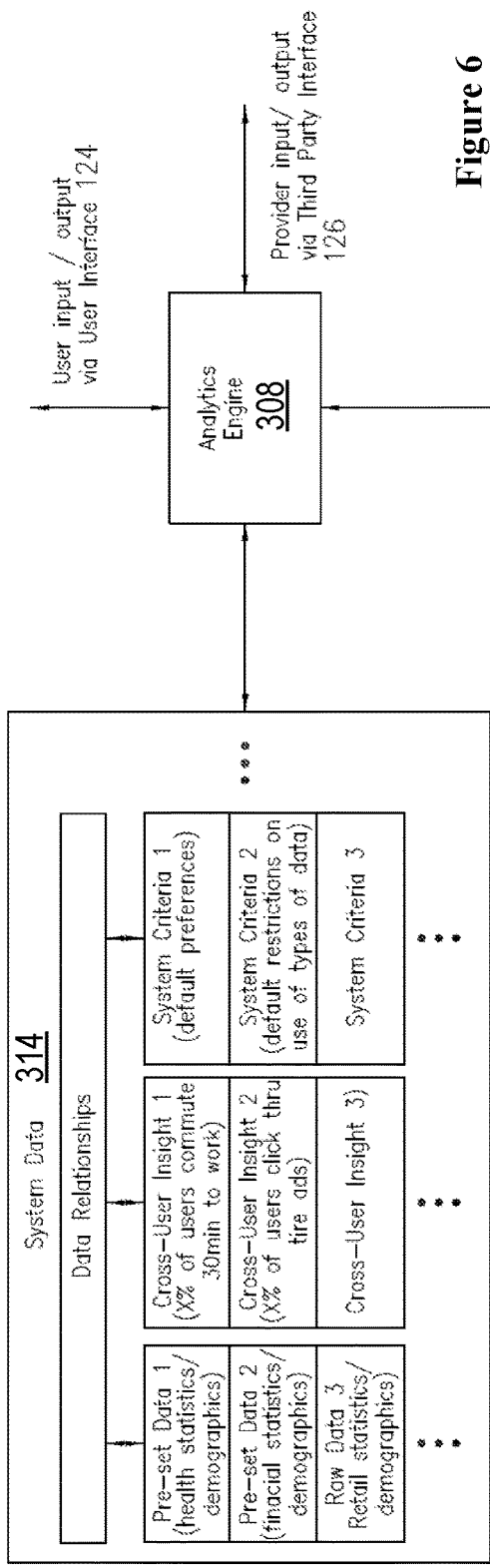
FIG. 6 is an example of data modeling/flow in accordance with the invention.
Figure 6:
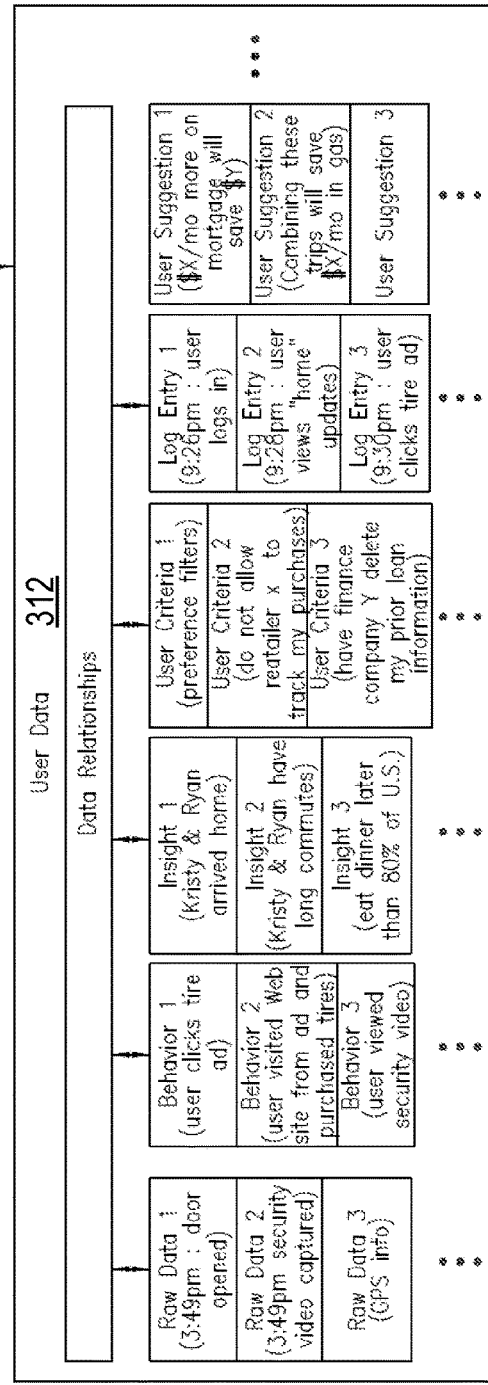

FIG. 6 includes an example to illustrate how data might be modeled in accordance with the invention. As shown in FIG. 6 and discussed elsewhere herein, various forms of user data may be stored as user data 312. This may include, for example, raw personal data (such as received via information providers 109), behavioral data about the user (such as generated by their use of portable system 102), user criteria (such as may be submitted by the user via user interface 302 and/or portable system 102), and log entries generated by the system. It may also include insight data and user suggestions generated by analytics engine 308. As also discussed elsewhere herein, the system may also store system data 314, which might include, for example, pre-set statistical and demographic data for various subject areas, such as health, finance, retail, etc. It might include pre-determined system criteria for how to process, store and/or analyze user data (such as default criteria in the absence of criteria specified by the user).

Analytics engine 308 may input any of the aforementioned user data and system data such as device data and sensor data, as well as input from the user via user interface 302, and process this information together to generate additional insight data and/or user suggestion data. This may be accomplished using data logic algorithms, statistical analysis, data analytics, and data manipulation in a manner known to those of ordinary skill in the art. This may include, for example, conventional software based statistical analysis functions, financial functions, time-series functions, text string functions, grouping functions, etc. It could also incorporate software based audio and video analytics capability (and the re-introduction of data outputted from such analytics back into the aforementioned functions). It may also include software based interactive, multi-user variations of these and other tools, as are being applied to "big data" (e.g., combining conventional analysis tools with querying among users to iterate through the analysis of large, disparate sources of data).

Some data analysis techniques that might be employed also include A/B testing, association rule learning, classification, cluster analysis, crowd sourcing, data fusion and integration, ensemble learning, genetic algorithms, machine learning, natural language processing, neural networks, pattern recognition, anomaly detection, predictive modeling, regression, sentiment analysis, signal processing, supervised and unsupervised learning, simulation, time series analysis and visualization. Multidimensional big data can also be represented as tensors, which can be more efficiently handled by tensor-based computation, such as multi-linear subspace learning.

Additional technologies also being used with big data that may be used in the invention include massively parallel-processing (MPP) databases, search-based applications, data-mining grids, distributed file systems, distributed databases, cloud based infrastructure (applications, storage and computing resources) and the Internet. This can be accomplished, of course, in various combinations of architectures, single or multiple processors, single or multiple server, single or multiple database, etc.

Generated data specific to the user may be outputted back to user data 312, user interface 302, or any other parts of the system. Data that relates to multiple users (such as those within a user's group) may similarly be outputted.

The system may be used to create insight data that incorporates "sewing" related to an analysis of various types of data to enable the user to track how they are doing in relation to goals that they have established, or in relation to other users.

Figure 7A:
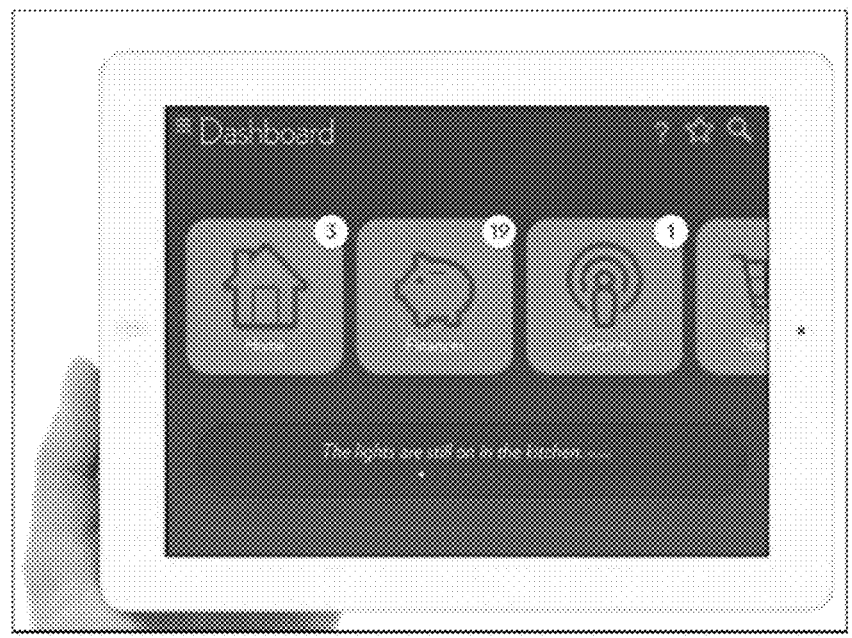
FIGS. 7(a)-(e) are pictures illustrating additional examples of the operation of a system employing the invention.
Figure 7B:
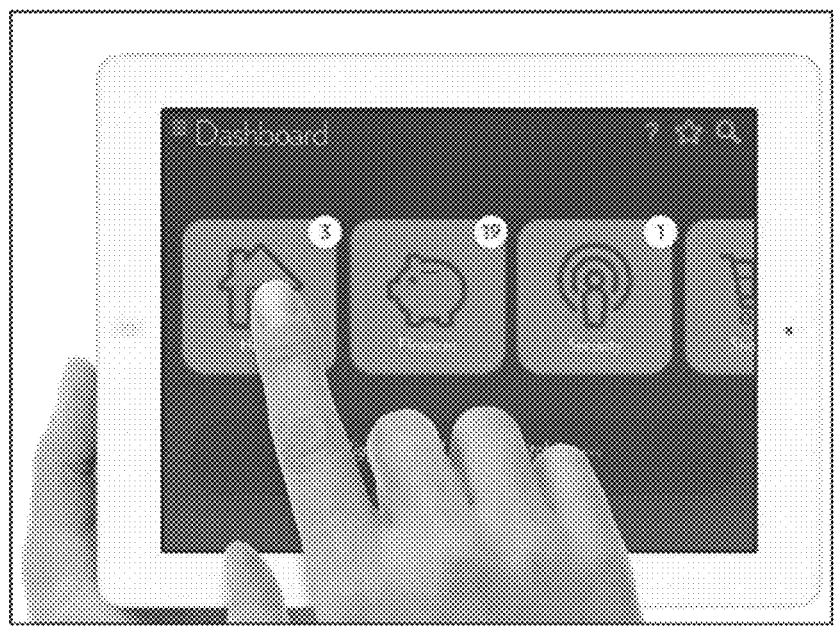
Figure 7C:
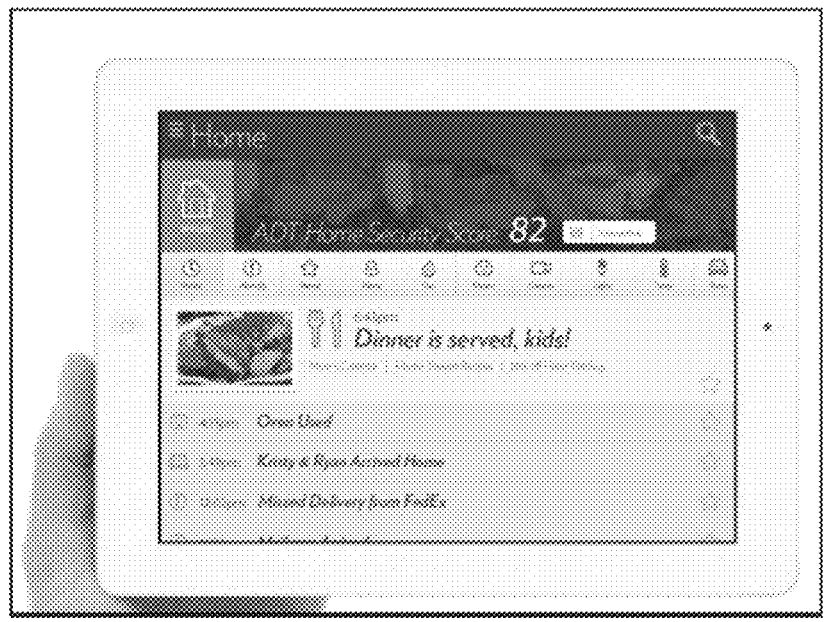
Figure 7D:
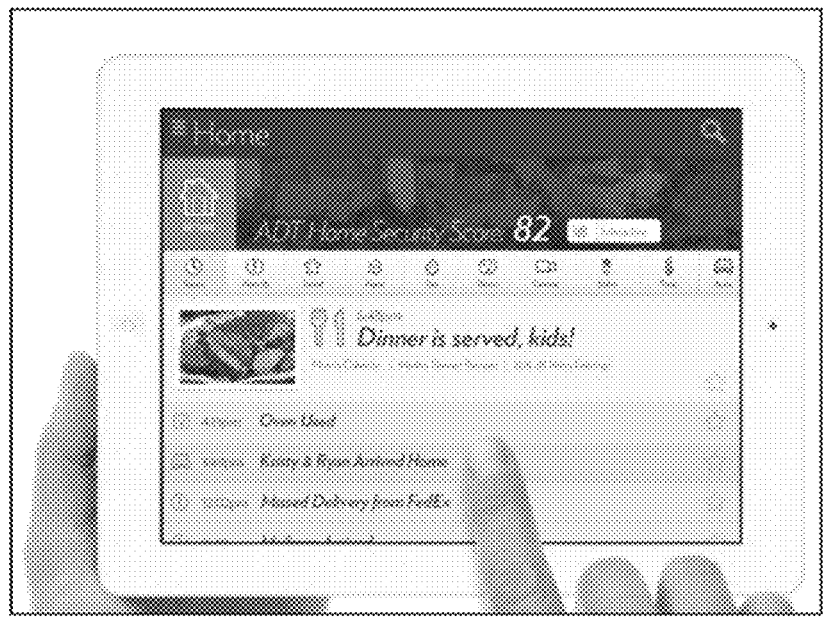
Figure 7E:
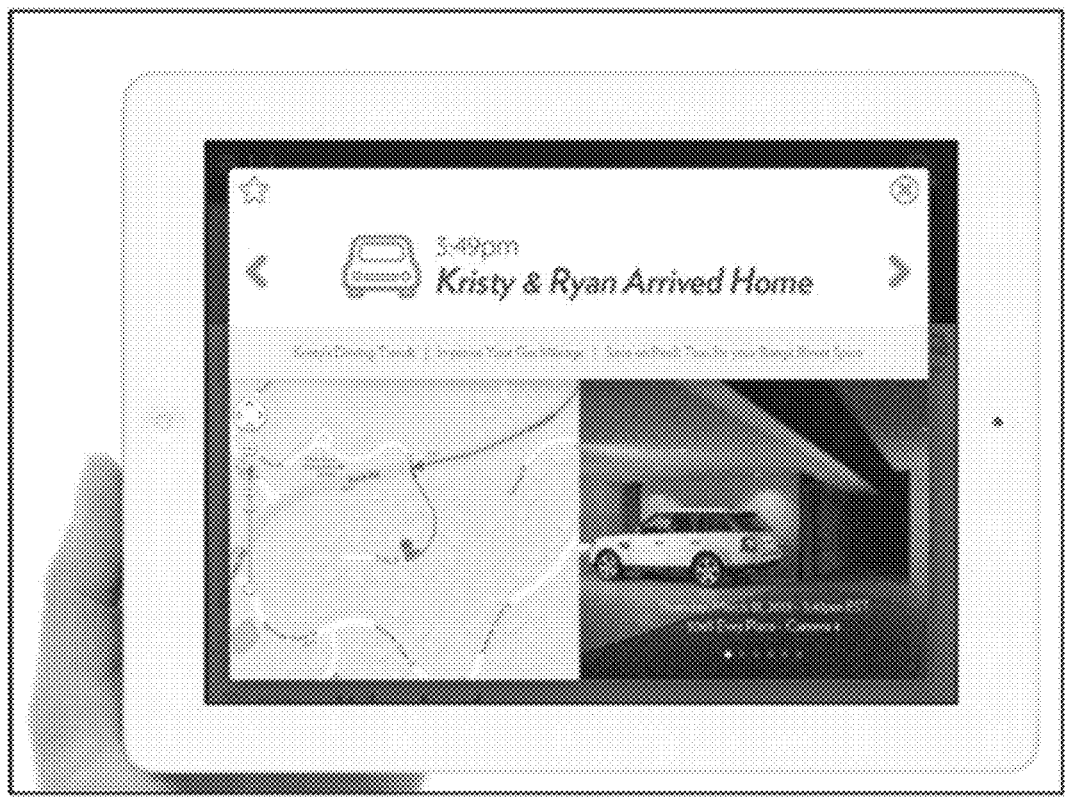

In the examples in FIGS. 7(c)-7(d), the user has a "Home Security Score" of "82." Analytics engine 308 may use algorithms that take user defined (or predefined) criteria and apply them against the security related data for the user contained within the user and system data (e.g., information gathered by peripherals 112 at the user's home, one more portable systems 102, of the user or other users in a group, and/or remote service site 106) to create this security score. These criteria could include comparing against similar scoring across a pool of other users, or against goals specifically set by the user as to the "level" of security that they would like to achieve. In another embodiment, portable system 102 may generate insight data about the user using based on at least one of the situational data, past situational data, profile data stored in a user profile, and other data provided by an information provider.

Those of skill in the art will appreciate that the system may also create "scoring" that is a combination of different types of personal data, or combinations of scoring for different types of data—for example, and omnibus score (e.g., a "life score") that is a combination of a significant number of the different scores tracked by the system.

A system employing the invention provides a user with a high degree of control and privacy over the use of his/her data. The system allows users to indicate that they wish to block selected personal data from being used by one or more information providers 106, and to have this personal data deleted from the respective data sources. Similarly, if the user no longer wishes to have a marketing partner track his/her personal data, the user would have the ability, through the system, to "opt out"—at which point the marketing partner would be blocked from gathering (or at least using) additional personal data of the user, and perhaps to delete some or all existing data. Those of ordinary skill will also appreciate that instead of an absolute "opt-in"/"opt-out", the user (via the system of the invention) may allow for use of his/her personal data (raw data, insight data and behavioral data) or some portions thereof based on certain terms and conditions.

The control and privacy aspects of the invention provide significant advantages over the prior art. The invention provides transparency to a user on what personal data is used and control over when—a user effectively has a "stop" button for everything and can disable usage tracking. It provides the ability to erase personal data (including photos and video) permanently across all records of different information providers/marketing partners through a common platform. The invention also enables easy migration of data—the user owns his/her data and can move it easily across information providers and within remote service site 106. The user can safely access and control this personal data on any Internet connected device with a simple yet secure, one-click log-in.

The invention also enables a user to privately and securely share certain of their personal data (e.g., not just photos and video, but other personal data about their activities and personal life, where they've been, their health, etc.) with family and friends, who are also users with access to the system—such as members of their circle. User interface 302 enables each user to designate certain personal data to be shared and with whom it may be shared within the system. This can be done within portable system 102 as well.

Other users within the user's group may be enabled to socialize on the user's data (when permitted by that user) and the system may analyze the results of this socialization to generate further insight data about the user (and/or the other users who participated). For example, other users may provide comments to the user, or provide personal data about themselves not already captured in the system. The other users may themselves take some action (e.g., uploading pictures, visiting a marketing partner noted in the first user's data, etc.) based on the first user's data, thus creating their own behavioral data that can also be stored as insight data in regard to the first user, perhaps in conjunction with the personal relationship between the users as a friend or family member. The resulting personal data could be analyzed by the system in connection with any of the users.

This community aspect of the invention provides additional significant benefits over the prior art. The invention allows for privately connecting members with family and friends to enable information sharing and overall enhanced life and activity coordination; and creates a community of fellow users who share insights into how to leverage the solution to enhance and improve their lives.

The system may further be configured to help educate the user about the user's personal data, insight data, and behavioral data (and/or such data from others in the system that they care about—family, friends, even pets), such as by providing recommended actions the user may take, activities the user may participate in, or things that the user may acquire in order to, for example, become more efficient in their daily routines, or enhance wellness in various areas (physical, financial, etc.), or improving their scoring toward certain goals. Such digital footprint mapping and educational tools allow members to see where and how their data is used.

Figure 8:
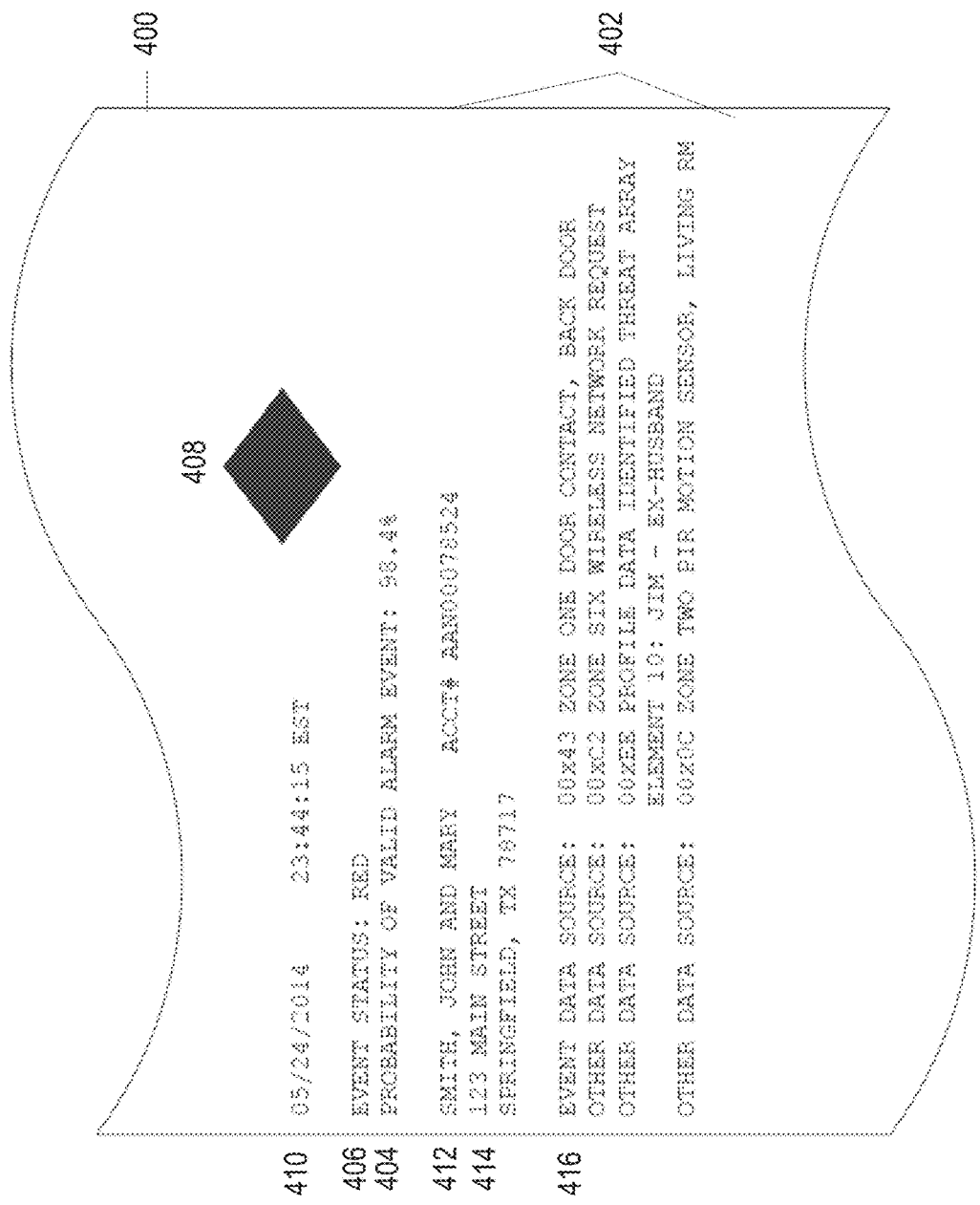
FIG. 8 includes an example of an illustrative embodiment of the provided situational data in accordance with the invention.

FIG. 8 illustrates a message including situational data that is provided to an alarm event operator at a remote service site 106, first responder site 108, and/or user of portable device 102. Situational data (402) may include at least one of a code indicating an alarm event, a code indicating an absence of an alarm event, a percentage indicating a probability of whether the event is an alarm event, a color scheme representing levels of probability of whether the event is an alarm event, a time and date code, a customer identifier, a premises identifier and an event identifier.

In particular, message 400 may include situational data 402 that includes various indicators, such as percentage 404 that represents a calculated probability of whether the event is an alarm event, and color scheme 406 and 408 represent levels of probability of whether the event is an alarm event. Percentage 404 qualifies the likelihood that the event is an alarm event, while color scheme 406 and 408 allow for a less granular, but more readily discernable categorization of situational data 402. As further shown in FIG. 8, color scheme 406 and 408 may be represented in any number of ways, such as text 406, or as a colored shape 408. In addition, a text embodiment of color scheme 406 may be replaced by an array of words, suggestive of the degree of urgency associated with situational data 402. For example, color scheme 406 containing "Red, Yellow, Green" may also be represented as "Emergency, Caution, Event". Similarly, colored shape 408 may use the dimensions, quantity, perimeter of a shape to suggest a degree of urgency. For example, situational data 402 possessing a high degree of urgency may have colored shape 408 with a large size as opposed to a medium or small size, three shapes as opposed to two or one shapes, or an octagon as opposed to a triangle or circle.

A time and date code 410, along with a customer identifier 412, or premises identifier 414 may be provided with information regarding when and where the event took place as well as who the event is likely to affect. Event identifier 416 may provide additional benefit by supplying sensor data, device data and/or other data. This information may provide to the remote service site and/or portable device with valuable information about the nature of the alarm event that can be used for further verification.

Situational data 402 may include time and date code 410 representing the instance of the event, customer or account identifier 412, a premises identifier 414 and/or event identifier 416. While FIG. 8 shows message 400 including various indicators or data, those skilled in the art will recognize the value of using any portion or all of the above mentioned components of situational data 402, such as an alternative embodiment that may only include data pertaining to premises identifier 414 or event identifier 416 along with one indication of the probability of whether the event is an alarm event.

Figure 9:
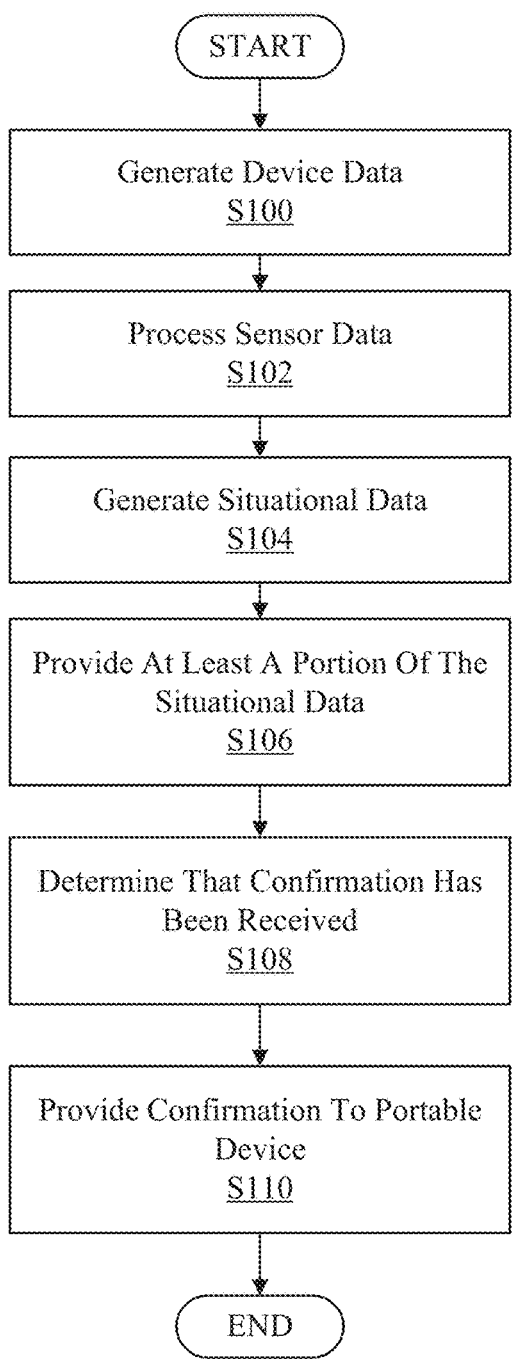
FIG. 9 is a signaling flow diagram of an exemplary event process for an event module of the invention in accordance with the principles of the invention.

An exemplary event process performed by event module 219 is described with reference to FIG. 9. Processor 214 generates device data for determining the location of the portable device. The device data may include device location information as discussed above (Block S100). Processor 214 processes sensor data in response to an event (Block S102). The sensor data is from at least the portable device. Processor 214 generates situational data for the processed event based on the sensor data and the device data (Block S104). In one embodiment, the situational data includes information indicative of whether the event is an alarm event, and if the event is the alarm event, whether the alarm event is one of a personal event and premises event. In one embodiment, the personal event is at least one of a crime against the user, a change in a medical condition of the user and a heightened state of concern by the user. In one embodiment, the premises event is at least one of a perimeter intrusion detection, a fire detection, a smoke detection, a gas detection, a flood detection, a high temperature detection and a low temperature detection.

Processor 214 provides at least a portion of the situational data to a remote service site if the event is determined to be the alarm event, i.e., to an operator at the remote service site who may be authorized to take action on behalf of a user of the portable device (Block S106). In one embodiment, the action includes the ability to contact at least one first responder. Processor 214 determines that confirmation has been received (Block S108). The confirmation indicates the remote service site is responding to the event based on the provided situational data. Processor 214 provides the received confirmation to the portable device of an action taken by the alarm event operator based on the provided situational data (Block S110). The confirmation is received via at least one of a two-way voice communication and an electronic notification.

Figure 10:
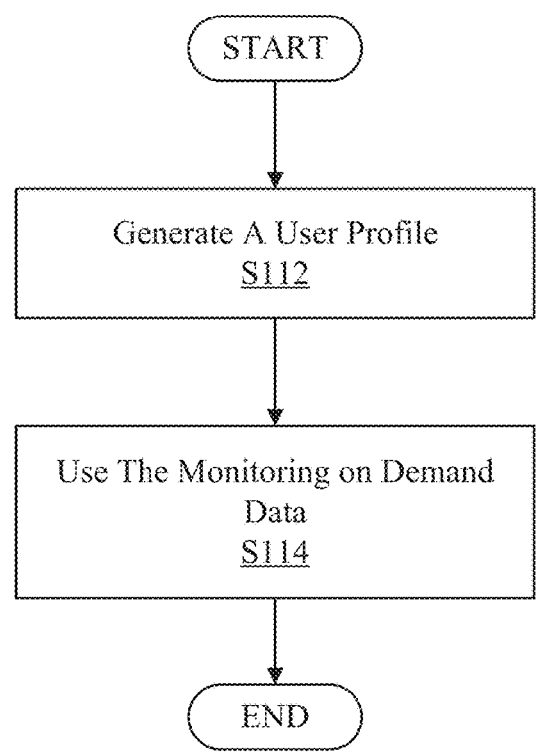
FIG. 10 is a signaling flow diagram of an exemplary monitoring/response on demand process for a demand module of the invention in accordance with the principles of the invention.

An exemplary monitoring/response on demand process of demand module 220 is described with reference to FIG. 10. Processor 214 generates a user profile containing monitoring on demand data indicative of at least one action to be taken for a plurality of alarm events (Block S112). Processor 214 uses the monitoring on demand data in generating the situational data and in determining the portion of the situational data to provide to the alarm event operator (Block S114).

Figure 11:
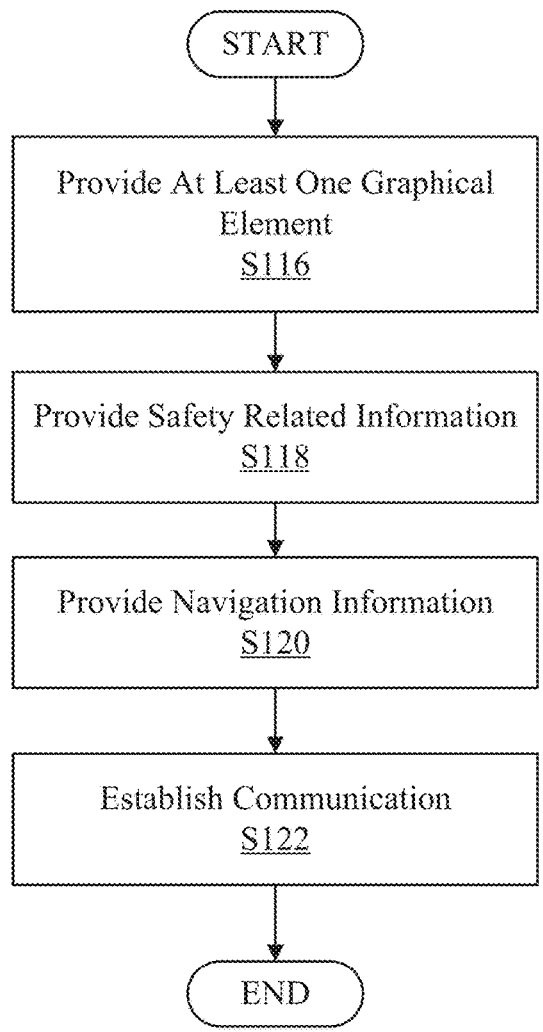
FIG. 11 is a signaling flow diagram of an exemplary overlay process for an overlay module of the invention in accordance with the principles of the invention.

An exemplary overly process of overlay module 221 is described with reference to FIG. 11, Processor 214 provides at least one graphical element overlaying location information and indicating the location of at least one of the portable device and a designated portable device (Block S116). Processor 214 provides safety related information based at least in part on the location information and the location of the portable device (Block S118). Processor 214 provides navigation information for the user of the portable user device and users of the designated portable device (Block S120). Processor 214 establishes communication with the other designated portable device using at least one graphical element (Block S122).

Figure 12:
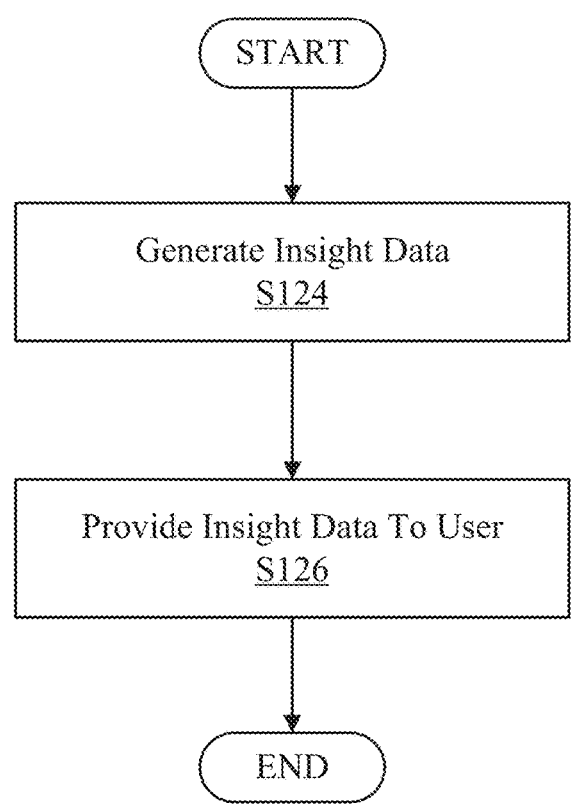
FIG. 12 is a signaling flow diagram of an exemplary insight process for an insight module of the invention in accordance with the principles of the invention.

An exemplary insight process of insight module 222 is described with reference to FIG. 12, Processor 214 generates insight data about the user based on at least one of the situational data, past situational data, profile data stored in a user profile and other data provided by an information provider (Block S124). Processor 214 provides the insight data to the user through a user interface in a format that is contextually relevant to the user (Block S126).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A method for a system to interact with a portable device and to process personal and premises events, the method comprising:
   generating device data for determining the location of the portable device;
   processing sensor data in response to an event, the sensor data being from at least the portable device;

generating situational data for the processed event, the situational data being based on the sensor data and the device data, the situational data including information indicative of:
 whether the event is an alarm event; and
 if the event is the alarm event, whether the alarm event is one of a personal event and premises event;
providing at least a portion of the situational data to the remote service site if the event is the alarm event;
determining that confirmation has been received, the confirmation indicating the remote service site is initiating a response to the event based on the provided situational data; and
providing the received confirmation to the portable device.

2. The method of claim 1, wherein the confirmation further indicates that a person having access to the remote service site is initiating the response.

3. The method of claim 1, wherein:
 the personal event is at least one of a crime against the user, a change in a medical condition of the user and a heightened state of concern by the user; and
 the premises event is at least one of a perimeter intrusion detection, a fire detection, a smoke detection, a gas detection, a flood detection, a high temperature detection and a low temperature detection.

4. The method of claim 1, wherein the sensor data comprises data provided by at least one device, the at least one device including at least one of a door contact, a window contact, a carbon monoxide detector, a smoke detector, a glass break detector, a motion detector, a video camera, an audio sensor, an accelerometer, a vibration sensor, a keypad, a pressure sensor, a humidistat, a thermostat, a temperature sensor, a fingerprint reader, biometric reader, an infrared image sensor, a vapor sensor, a wireless network router, a photosensor, a tamper switch, electromechanical actuator, a GPS device, active assets tag, passive asset tag, an embedded processor in an appliance, a glucose meter, a blood pressure meter, a personal emergency response system, a wearable mobile device and a smart phone.

5. The method of claim 1, wherein the situational data comprises at least one of a code indicating an alarm event, a code indicating an absence of an alarm event, a percentage indicating a probability of whether the event is an alarm event, a color scheme representing levels of probability of whether the event is an alarm event, a time and date code, a customer identifier, a premises identifier and an event identifier.

6. The method of claim 1, further comprising:
 generating a user profile containing monitoring on demand data indicative of at least one action to be taken for each of a plurality of alarm events; and
 using the monitoring on demand data to generate the situational data and to determine the portion of the situational data to provide to the alarm event operator.

7. The method of claim 1, further comprising:
 enabling communication between the portable device and the remote service site;
 generating the situational device data based on at least a portion of sensor data; and
 controlling the operation of an input component, a wireless communication component and a user interface of the portable device.

8. The method of claim 7, further comprising utilizing the user interface to:
 provide at least one graphical element overlaying location information and indicating the location of at least one of the portable device and a designated portable device;
 provide safety related information based at least in part on the location information and the location of the portable device;
 provide navigation information for the user of the portable device and users of the designated portable device; and
 establish communication with the designated portable device using at least one graphical element.

9. The method of claim 7, further comprising utilizing the user interface to enable the user to use a graphical element to establish communication with at least one of the alarm event operator, the remote service site, a first responder and a first responder site.

10. method of claim 1, further comprising:
 generating insight data about the user based on at least one of the situational data, past situational data, profile data stored in a user profile and other data provided by an information provider; and
 providing the insight data to the user through user interface in a format that is contextually relevant to the user.

11. A portable user device comprising:
 a communicator configured to:
  receive premises sensor data from at least one premises device at a premises;
  communicate with at least a remote service site;
 at least one device sensor configured to generate device sensor data; and
 a processor configured to:
  determine whether a personal event has occurred based on at least one of the premises sensor data and device sensor data, the personal event corresponding to an event occurring proximate the portable user device;
  determine whether a premises event has occurred based on at least one of the premises sensor data and device sensor data, the premises event corresponding to an event occurring at the premises;
  generate situational data in response to determining at least one of the personal event and premises event has occurred, the situational data being based on at least one of the premises sensor data and device sensor data; and
  cause the communicator to transmit the situational data to the at least the remote service site, the situational data indicating at least a first responder is authorized to act on behalf of a user of the portable user device.

12. The portable user device of claim 11, wherein the communicator is configured to communicate with at least the first responder site; and
 the processor is further configured to cause the communicator to transmit the situational data to at least one of the first responder site and remote service site, the situational data indicating that at least one of the first responder site and remote service site are authorized to act on behalf of a user of the portable user device.

13. The portable user device of claim 11, wherein the processor is further configured to cause the portable device to automatically synchronize with the at least one premises device to initiate receipt of premises sensor data.

14. The portable user device of claim 13, wherein the processor is further configured to determine a location of the portable user device, the automatic synchronization with the at least one premise device occurring in response to determining the portable user device is proximate the premises.

15. The portable user device of claim 11, further comprising a memory configured to store a plurality of service profiles, each of the plurality of service profiles defining rules for:
- monitoring for at least one of the personal event and premises event;
- automatically communicating situational data to the at least one of the first responder site and remote service site;
- responding to the at least one of the personal event and premises event; and
- the determination whether the personal event and premises event occurred and transmission of situational data being performed in accordance with the rules defined in a service profile being implemented by the portable user device.

16. The portable user device of claim 15, wherein the plurality of service profiles are configurable by a user of portable user device.

17. The portable user device of claim 16, wherein the memory is further configured to store a list of contacts; and each service profile further defining:
- at least one contact from the list of contacts to notify in response to the at least one of the personal event and premises event; and
- a type of situational data to provide to the at least one contact in response to at least one of the personal event and premises event.

18. The portable user device of claim 15, wherein the processor is further configured to:
- determine a location of the portable user device; and
- automatically select one of the plurality of service profiles to implement based at least in part on the determined location of the portable user device.

19. The portable user device of claim 11, wherein the communicator is further configured to receive insight data in response to the transmitted situational data, the insight data providing analysis of the situational data based on a tracked history of the portable user device.

20. The portable user device of claim 19, wherein the insight data includes at least one score;
- if the determination is made the personal event has occurred, the at least one score indicating a security level of an environment proximate the portable user device; and
- if the determination is made the premises event has occurred, the at least one score indicating a security level of the premises.

* * * * *